455-12 AU 233 EX
9/1/81 OR 4,287,597

United States Patent [19]

Paynter et al.

[11] 4,287,597

[45] Sep. 1, 1981

[54] SATELLITE CONTROLLED CLOCK

[75] Inventors: Donald A. Paynter; Lee Burpee, both of Goleta, Calif.

[73] Assignee: Arbiter Systems Incorporated, Goleta, Calif.

[21] Appl. No.: 939,849

[22] Filed: Sep. 5, 1978

[51] Int. Cl.[2] .............................................. H04L 7/00

[52] U.S. Cl. .................................... 455/12; 58/23 R; 455/51; 375/107; 368/47; 368/85

[58] Field of Search ................ 324/181, 188; 340/700; 358/192; 325/4, 58, 67, 363, 470; 178/69.1; 58/23 R, 24 R; 343/225

[56] References Cited

U.S. PATENT DOCUMENTS

| | | | |
|---|---|---|---|
| 3,798,650 | 3/1974 | McComas et al. | 343/225 |
| 3,824,548 | 7/1974 | Sullivan et al. | 325/363 |

*Primary Examiner*—Benedict V. Safourek
*Attorney, Agent, or Firm*—Wagner & Bachand

[57] ABSTRACT

A satellite disseminated time and date code is received and converted into local time signal and displayed. The ground stations scan a frequency spectrum for signals from geosynchronous satellites. Once found, the position and time information from the satellites is used to compute the correct local time.

24 Claims, 23 Drawing Figures

OPERATION

Read & Display

SATELLITE CONTROLLED CLOCK

BACKGROUND OF THE INVENTION

A unique service has recently become available throughout the whole of the Americas and even portions of Oceania and Europe with the launching of the GOES (Geostationary Operational Environmental Satellite) of the United States National Oceanic and Atmospheric Administration. Through cooperation with the United States National Bureau of Standards, a satellite disseminated time code is relayed from Wallops Island, Virginia to two stationary or synchronous satellites approximately 36,000 kilometers above the equator and geostationary. Time and data code signals along with observed satellite position information are transmitted by both satellites, the eastern and the western satellites. The time codes and information are available to any receiver capable of detecting and decoding the transmission.

The operational characteristics of the GOES satellites are described in Publication TFS-602 and titled NBS TIME VIA SATELLITES issued by the United States Bureau of Standards Boulder, Colorado 80302 on Jan. 1, 1978. Described in that publication and in the description below is the signalling format used by the satellites.

The operation of the satellite time system and a receiver capable of detecting, decoding and displaying time signals from the satellites is described in U.S. Pat. No. 4,014,166 issued on Mar. 29, 1977 to Joseph V. Cateora et al and assigned to the U.S. Government.

The receiver disclosed in U.S. Pat. No. 4,014,166 receives and decodes the time codes but has no provision for correcting for satellite errors or for time error corrections for the receivers actual position or to obtain true local, zone or UTC time. The net result is that the accuracy available via satellite time is significantly degraded in any known receiver with which we are familiar.

BRIEF STATEMENT OF THE INVENTION

Given the foregoing State of the Art, we have determined that the value of satellite time can be greatly enhanced if the receiver can calculate the total transmission path delay incorporating the effects of actual transmitter, satellite and receiver position. Since the satellite position is transmitted as part of the code sequence and the transmitter and receiver positions are known it is possible employing our invention to provide continuous, accurate time display with these parameters and any changes which occur in satellite position or receiver position to be introducable into time corrections.

We have also found it possible to decode and display the one pulse per second signal provided by the GOES satellites and to generate a local similar signal which acts as a local clock for local use in controlling other equipment and to maintain a display during periods of non-operation of the GOES satellite or interference conditions. We have also developed circuitry which will continuously compare any local external clock 1 pulse per second time with satellite 1 pulse per second signal and to generate and display a deviation signal if it exists between the two.

We have also discovered that it is possible to generate and introduce offset signals to provide for the local time zone and for daylight savings time to allow these corrections to be made in the display without otherwise interfering with the operation of the receiver or local clock.

Basically our invention involves a coherent synchronous digital ultra high frequency receiver which receives signals from a broad band antenna having its own preamplifier stage and providing satellite signals at −120 dbm or greater to the receiver in the 468.8 MHz range. This frequency range includes signals at 468.8375 MHz from the Eastern Satellite and Western Satellite signals at 468.8250 MHz.

The receiver includes automatic tuning circuitry which scans the selected frequency band for the Satellite chosen. When the receiver detects the Satellite signal it shifts to a synchronization mode employing the synchronizing circuitry of the receiver. The receiver also includes delay path calculation circuitry which is enabled after the receiver is synchronized with the satellite signal.

Signal calculation processor circuitry includes a selfcheck circuit which requires that the delay path calculation be repeated if an error is detected. The selfcheck circuitry also compares received time signals from the satellite with the displayed time of the receiver to correct the display if it is incorrect.

Our receiver also includes provision for introducing an offset for time zones to provide local time as well as standard or daylight savings time. Our receiver further includes provision for locking out erroneous satellite time and position information.

Our receiver additionally includes a time interval measurement circuit for measuring the time deviation of a user supplied 1 pulse per second external clock with respect to the satellite time. This circuitry drives a deviation display which continuously represents any deviation of the local signal from the received standard clock pulses from the satellite.

BRIEF DESCRIPTION OF THE DRAWING

This invention may be more clearly understood from the following detailed description and by reference to the drawing in which.

DETAILED DESCRIPTION OF THE INVENTION

Figure 1:
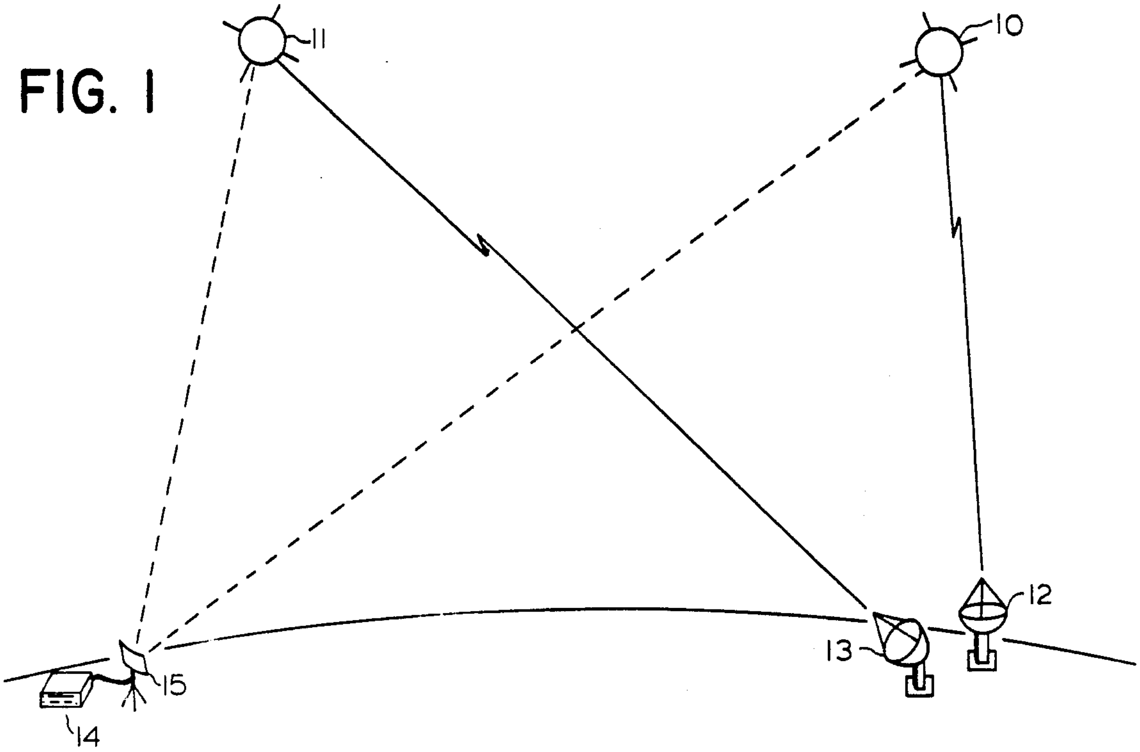
FIG. 1 is a pictoral representation of the typical operational situation found for this invention.
Figure 2:
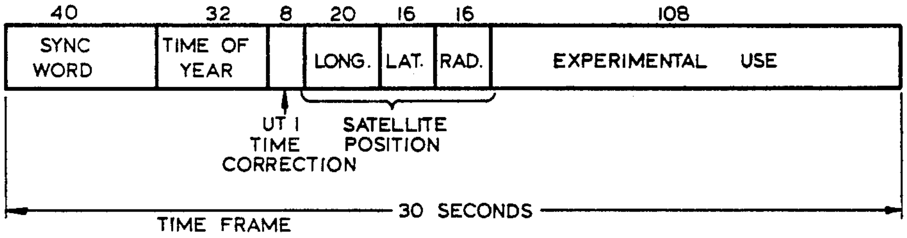
FIG. 2 is an interrogation channel format diagram of satellite signals of FIG. 1.
Figure 3:
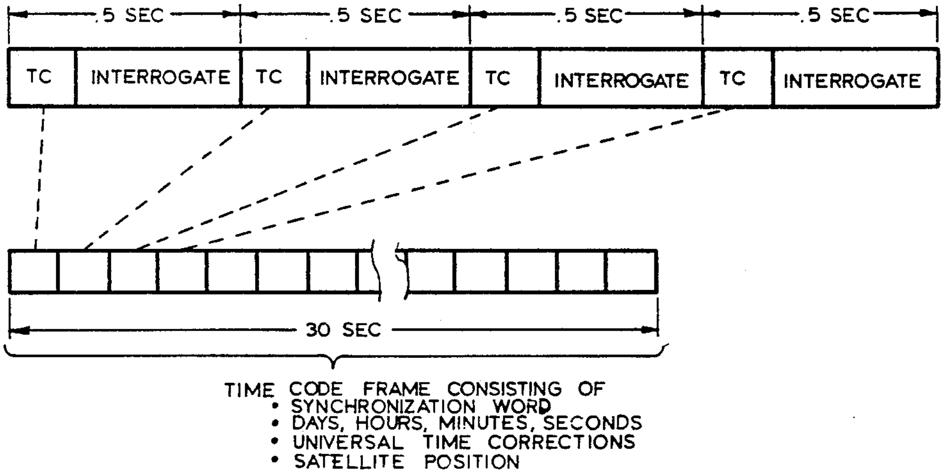
FIG. 3 is time code format diagram.

Now referring to FIG. 1, an operational situation involving this invention is illustrated employing the Eastern Satellite 10 and the Western Satellite 11 each relative geostationary above the equator respectively at 135 and 75 degrees west longitude. These satellites are approximately 36,000 kilometers above the surface of the earth and at their relatively stationary orbits may be received by appropriate radio receivers over the North American continent and most of South America while the Eastern Satellite 10 may be received throughout the North and South Atlantic oceans, parts of Europe and Africa. The Western Satellite 11 has coverage of virtually the entire Pacific Ocean. Time information, date information and Satellite position information is transmitted to both of these Satellites from an installation at Wallops Island Virginia represented by antennas 12 and 13 each directed towards a respective Eastern or Western Satellite. As described in the National Bureau of Standards document the time code, data code and satellite position is transmitted employing phase shift modulated carrier and are right hand circularly polarized. The data rate is 100 bits per second and band width of the transmission 400 Hz. The time code is time division multiplexed (interlaced) with interrogation messages. Once every half-second, a time code word, 4 bits, is transmitted. A complete time code is transmitted every 30 seconds beginning on the half-minute giving the day of the year, hour, minute, and second. The format and location of each time code word as well as relative length is illustrated in FIG. 2. The time code frame consists of the synchronization word e.g. 40 bits of alternating ones and spaces followed by encoded day, hours, minutes and seconds. The universal time correction, plus satellite position, latitude, longitude and radius, complete the entire code frame which is transmitted for a period of thirty seconds. This is illustrated in FIG. 3. Referring again to FIG. 1, a receiver 14 and its associated antenna 15 is shown as located within the field of view of both satellites 10 and 11 and thus can receive time code signals from either of the satellites. The entire continental United States falls within this dual satellite area. The antenna 15 and the receiver 14 are shown as located at North 34.45 degrees latitude and West 119.83 degrees longitude a location approximating Santa Barbara, California.

SATELLITE GEOMETRY

Figure 1A:
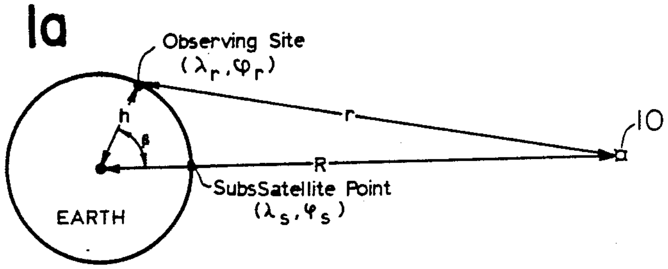
FIGS. 1*a* and 1*b* are simplified graphical presentations of the geometric relationships involved in the operation of this invention.

The geometric relationship of the earth and either satellite is illustrated in FIG. 1*a*, which is derived from the National Bureau of Standards Technical Note 638, "A Synchronous Satellite Time Delay Computer", July, 1973, to which reference should be made for further explanation.

Suffice it to say the path delay calculations accomplished by this invention involve the solution of the geometric relationship there described. Referring now to FIG. 1*a*, the method used in calculating the path delay is to first solve the triangle formed by straight lines joining the satellite 10, the center of the earth and the antenna 15 site This solution from plane trigonometry is $$r = \sqrt{R^2 + h^2 - 2Rh\cos\beta}\,, \quad (1)$$

where r is the range from the antenna 15 to the satellite, R is the distance from the satellite 10 to the center of the earth, h is the distance from the receiver to the center of the earth and $\beta$ is the central angle between the sub-satellite point and the receiver. The quantity R is a component of the satellite's position and is available via the satellite broadcast. The quantity h is related to the geodetic latitude, $\psi$, of a site by the following equation $$h = a\sqrt{\frac{1 + \frac{b^4}{a^4}\tan^2\phi}{1 + \frac{b^2}{a^2}\tan^2\phi}}\,, \quad (2)$$

where a=6378.2064 km, the earth's semi-major axis; and b=6356.5838 km, the earth's semi-minor axis.

For use in the equations below, the geocentric latitude, $\phi'$, is computed from the geodetic latitude, $\phi$, by the following equation.

$$\tan\phi' = (b^2/a^2)\tan\phi. \quad (3)$$

The sub-satellite latitude is already referenced to the center of the earth and does not need to undergo this transformation. In the following discussion, $\lambda$ is longitude and subscripts s and r denote sub-satellite point and receiver site respectively.

All that is left then is the computation of cos $\beta$. The direct solution may be obtained from the triangle consisting of the sub-satellite point, the site, and the intersection of the z axis with the spherical earth (i.e., the North Pole) using spherical trigonometry as follows:

$$\cos\beta = \sin\phi_r'\sin\phi_s + \cos\phi_r'\cos\phi_s\cos|\lambda_s - \lambda_r|. \quad (4)$$

Using equations (1) through (4), the "down-link" free space propagation delay from the satellite to the receiver is easily determined by dividing the range by the velocity of free space propagation (0.2997925 km/$\mu$s). The procedure must be repeated substituting the transmitter for the receiver location to determine the "up-link" delay. The total free space propagation delay, then is the sum of the delays computing using the transmitter and receiver locations. The change in signal velocity through the troposphere and ionosphere and the accompanying ray bending can be shown to introduce only a few microseconds difference in the round-trip free space propagation time when operating above 100 MHz [2].

THE RECEIVER

Figure 4:
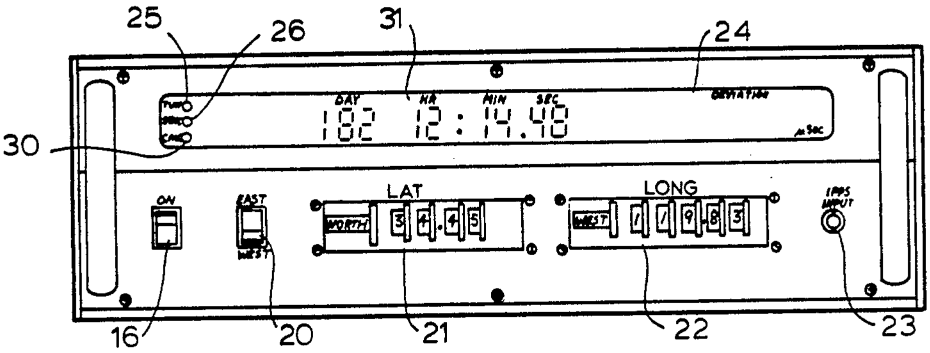
FIG. 4 is a front elevational view of the receiver of this invention.

The receiver of this invention and its operational controls may be seen in FIG. 4 as including the power switch 16 and a satellite selector switch 20 having two positions, East and West. A plurality of thumb wheel switches 21 are used to introduce the latitude information and a similar set of thumb wheel switches 22 are used to introduce longitude of the receiver into the receiver logic circuitry. The front panel receiver includes a jack 23 for introducing a one pulse per second input.

The receiver includes a display panel 24 including three LED displays indicating the status of the receiver operation.

LED display 25 is illuminated during the period in which the receiver is automatically tuning through the band which includes the satellite selected by selector switch 20. LED 26 is illuminated after tuning has been terminated and the satellite detected. The synchronizing of the local clock with the time code signals is signaled by the illumination of LED 26. After satellite detection and synchronization is accomplished the LED 25 and 26 are no longer lighted but LED 30 is illuminated to indicate that the delay path calculation is in process. Once each of these steps have been completed each of these displays 25, 26, and 30 are no longer illuminated and the correct day, hour, minute and second are displayed. One further display is present in the form of micro-seconds deviation between a user supplied external 1 PPS clock input and the 1 PPS signal as received from the satellite. Normally the deviation signal input is not illuminated if a local clock 1 PPS input is not present.

Figure 4A:
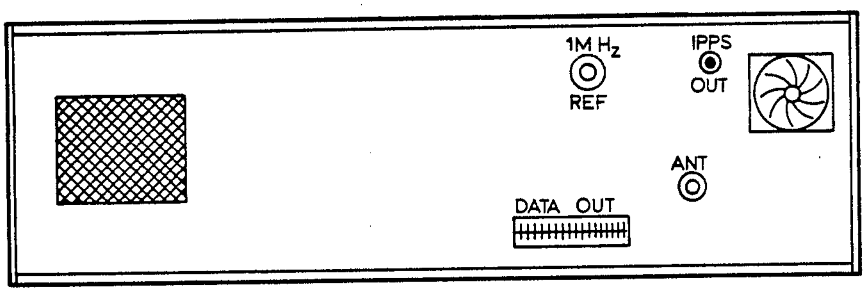
FIG. 4*a* is a rear elevational view thereof.

FIG. 4*a* shows the rear of the receiver including cooling fan 27, air inlet 28 and jacks for the input of signals from antenna 15 of FIG. 1 and output of 1 pulse per second, one MHz timing or clock signal and time data in IRIG-B format from the data out jack. A line cord unshown supplies 115 v 60 Hz power to the receiver.

Figure 5:
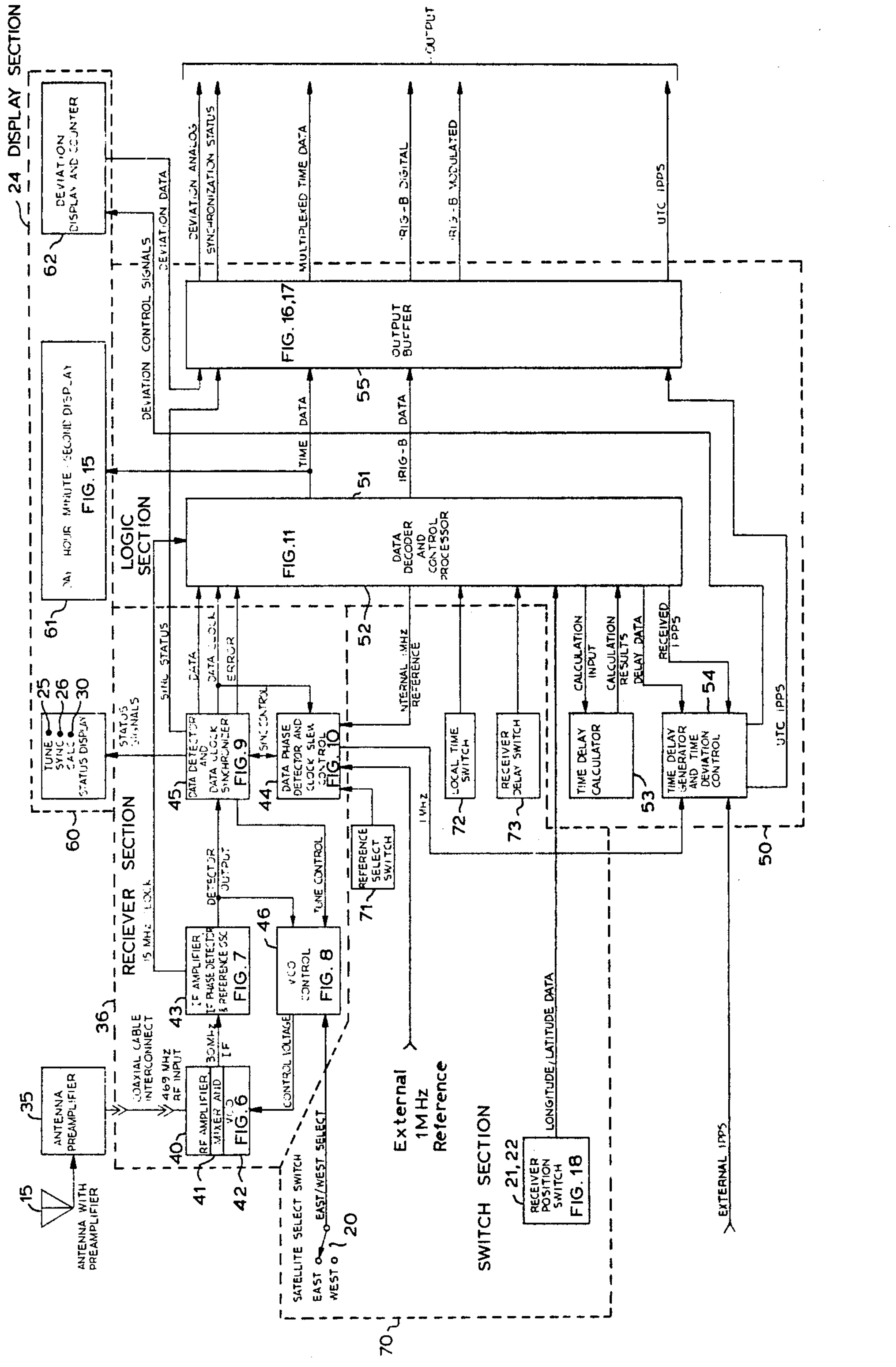
FIG. 5 is a block diagram of this invention.

For an understanding of the operation of the receiver with the inputs and displays illustrated in FIG. 4, one should now direct their attention to the block diagram of the receiver FIG. 5.

Now referring to FIG. 5 the antenna 15 is shown with its associated preamplifier 35 normally physically associated with the antenna and typically composed of two low noise tuned RF stages with associated bias control circuits in order to provide the required signal level to the receiver to follow. The receiver includes a receiver Section 36 composed of an RF amplifier 40, a mixer 41 and voltage control oscillator 42, an IF amplifier 43, and a phase and data detector 44 and 45 respectively, the latter of which includes clock synchronizing circuitry. The data phase detector also includes clock slew control circuitry. VCO control circuit 59 completes this section.

The next section of the receiver is the logic section 50 comprising a data decoder 51 and control processor 52, a time delay calculator 53, a time delay generator 54 and an output buffer stage 55 as well as a time delay generator and time deviation control circuit 54.

A display section 60 includes the receiver status display 25, 26, and 30 and the date and time display 61 and the clock deviation 62. A switch section 70 includes each of the control switches including the satellite select switch 20 a reference select switch 71, a local time switch 72, a receiver delay switch 73 and the longitude and latitude control switches 21 and 22 as shown in FIG. 4.

DETAILED CIRCUITRY

For a better understanding of this invention, each of the circuits are described as to their makeup in the preferred embodiment including actual component values and designations which appear on the drawing and which are actually used in the commercial embodiment of this invention. In the following schematic diagrams integrated circuits also include reference to pin numbers and Reference J refers to jumper and pin numbers as assistance to the reader.

Figure 6:
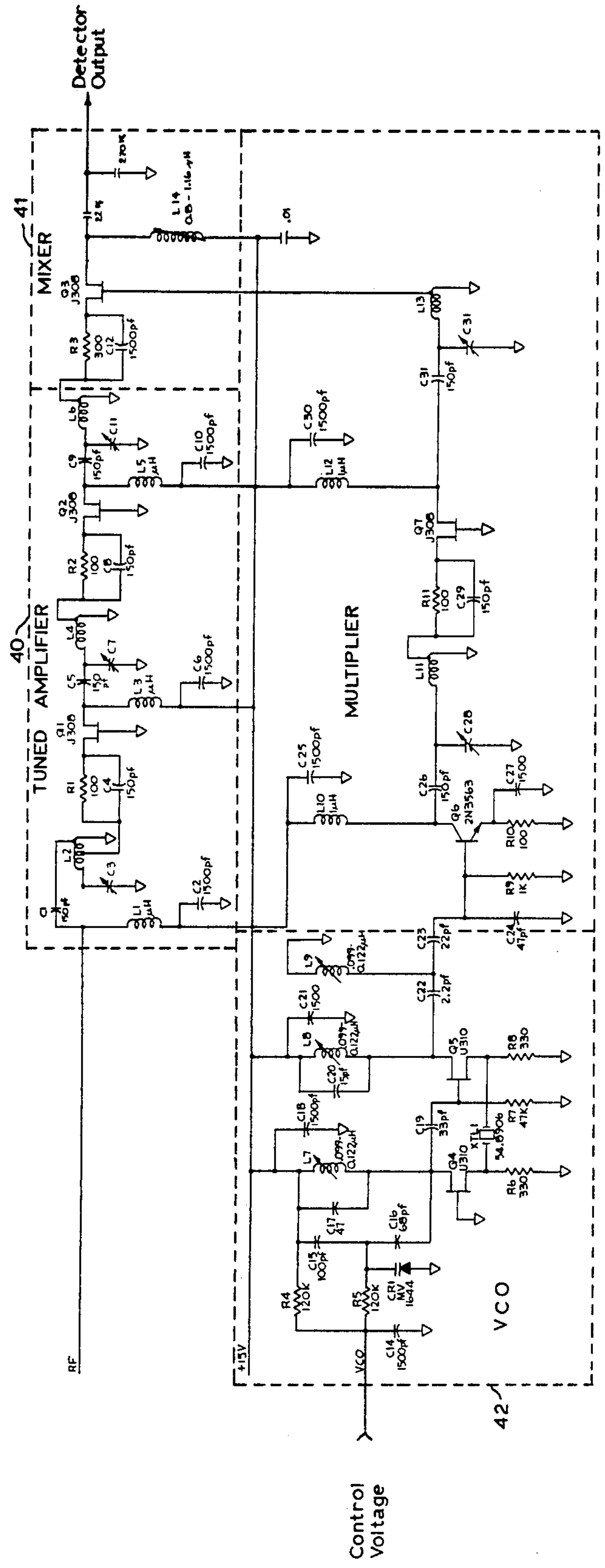
FIG. 6 is an electrical schematic diagram of the RF amplifier, voltage controlled oscillator and mixer of this invention.

Referring now to FIG. 6, the RF amplifier voltage controlled oscillator and mixer section may be seen in detail therein. The RF amplifier 40 includes two tuned amplifier stages Q1 and Q2 with their associated tuning networks with the output of the tuned amplifier 40 applied to a mixer stage 41 employing Q3 as its active element. The other input to the mixer stage is driven from the 438.8250 MHz or 438.8375 MHz output of the VCO section which is made up of voltage control oscillator 42 including a crystal XTL1 and two stages Q4 and Q5 which operate at one/eighth the VCO output frequency. The frequency multiplier amplifier composed of stages Q6 and Q7 is used to develop the final VCO output which is supplied to mixer 41.

IF AMPLIFIER AND PHASE DETECTOR

Figure 7:
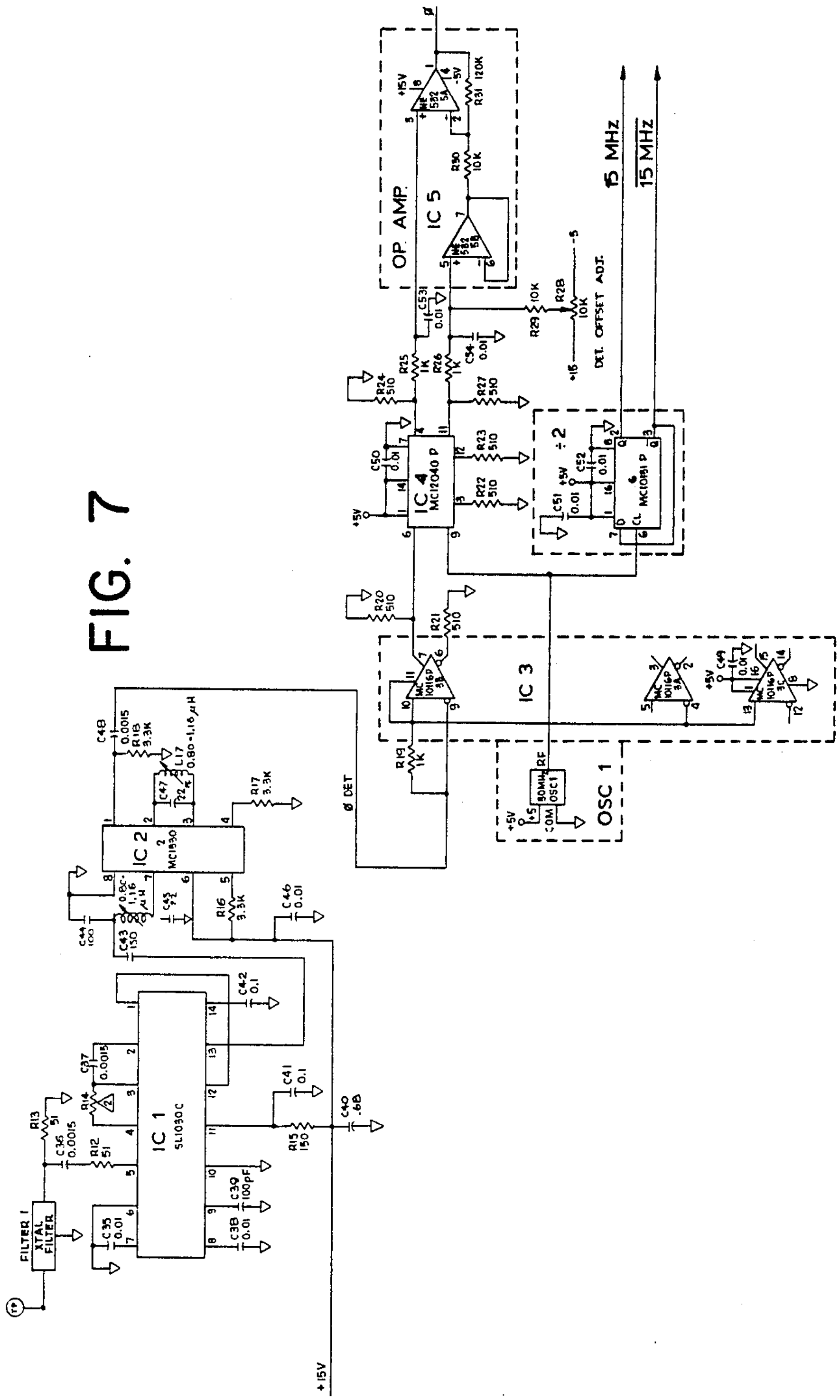
FIG. 7 is an electrical schematic diagram of the IF amplifier and phase detector thereof.

The schematic of the IF amplifier and phase detector 43 appear in FIG. 7 in which the output of the mixer 41 is coupled to the crystal filter 1 of FIG. 7 via inductor L14 which is tuned by the mixer output tuning capacitor for 30 MHz resonance. After filtering, the signal is amplified by linear amplifier IC1. A tuned interstage coupling network composed to capacitors C43, C44, and inductor L16 is used to couple the amplifier output to limiter stage IC2. The output of the limiter of IC2 is then applied to the input logic interface stage IC3 for conversion to emitter-coupled logic levels. A high speed phase detector IC4 is employed to detect phase differences between the 30 MHz signal derived from the satellite transmission and the crystal controlled 30 MHz reference oscillator OSCl. The phase detector pulse outputs are integrated by RC networks R25, C53, and R26, C54, before they are applied to the inputs of operational amplifier IC5. This amplifier produces the resultant phase detector output containing data encoded modulation signal on lead labelled $\phi$. A divide by two stage IC6 reduces the reference oscillator frequency output to 15 MHz for operation of the processor circuitry described below.

VCO CONTROL

Figure 8:
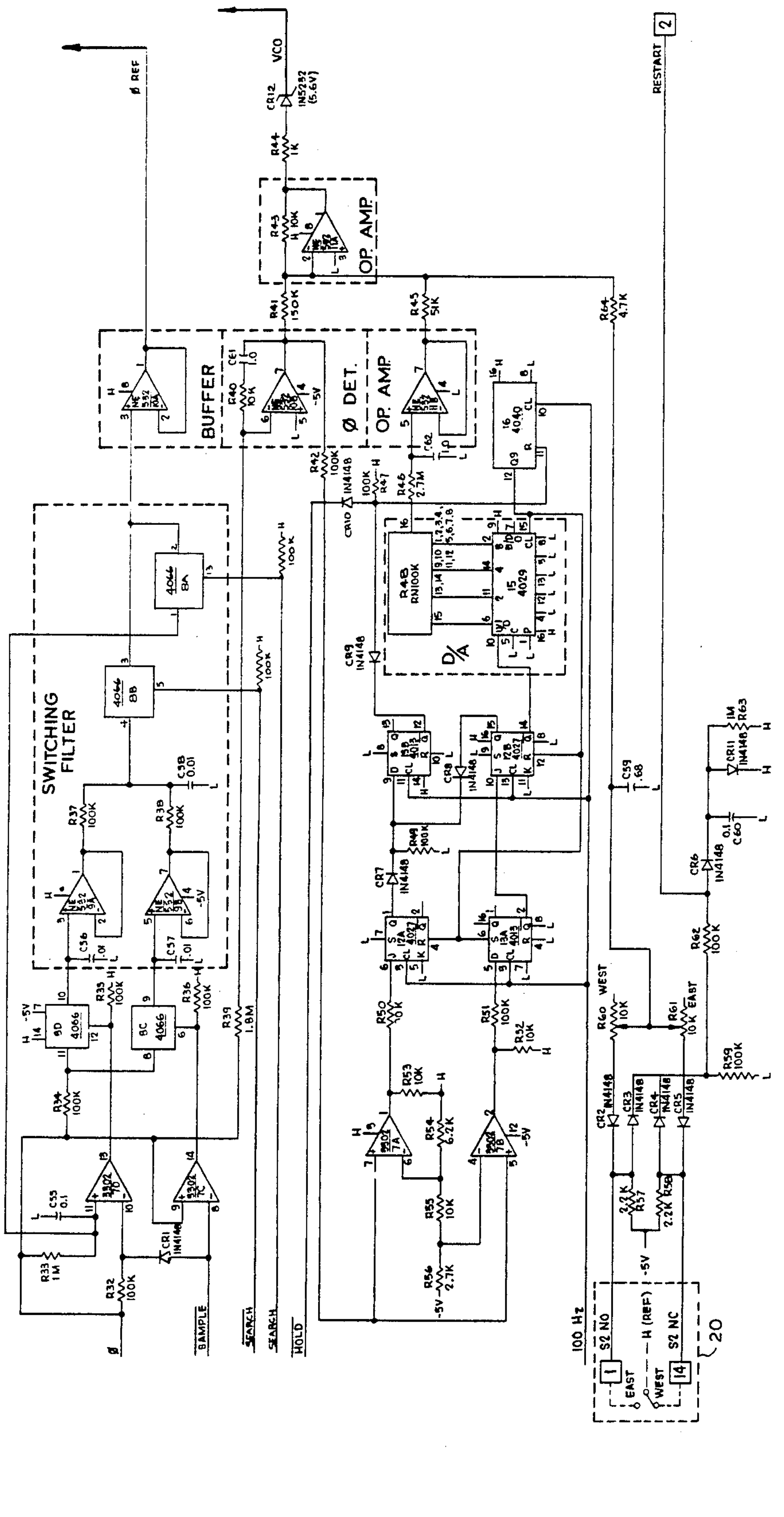
FIG. 8 is an electrical schematic diagram of the voltage controlled oscillator thereof.

The VCO control circuitry of FIG. 8 receives the phase detector output and produces a control voltage which tunes the VCO crystal oscillator for reception of the desired satellite signal. The control output labeled VCO on FIG. 8 is developed by operational amplifier IC11A in response to the combined inputs from the satellite select 20, the digitally stepped automatic tuning voltage from operational amplifier IC11B and the integrated phase detector output developed by operational amplifier IC10B. The integrator circuit correctively adjusts the VCO output frequency so that there is minimum average phase difference output from the phase detector. A counter IC15 and digital to analog converter R48 are used to develop the automatic tune voltage whenever called upon by control circuitry actions or whenever the integrator output approaches a limit in its operating range.

A phase reference voltage, labeled φREF is developed for use in the data recovery section of the receiver. The voltage is developed by a switching filter composed of IC8 and IC9 in combination with the RC network R34, C56, and C57 and R37, R38 and C58. A buffer amplifier IC10A produces the desired reference output.

DATA DETECTOR AND DATA CLOCK SYNCHRONIZER

The satellite modulation signal as produced by the phase detector contains self-clocked Manchester encoded data. It is necessary to develop a nonreturn-to-zero (NRZ) bit pattern and separate precisely synchronized data clock for operation of the data decoding and timing circuitry located on the main logic panel.

Figure 9:
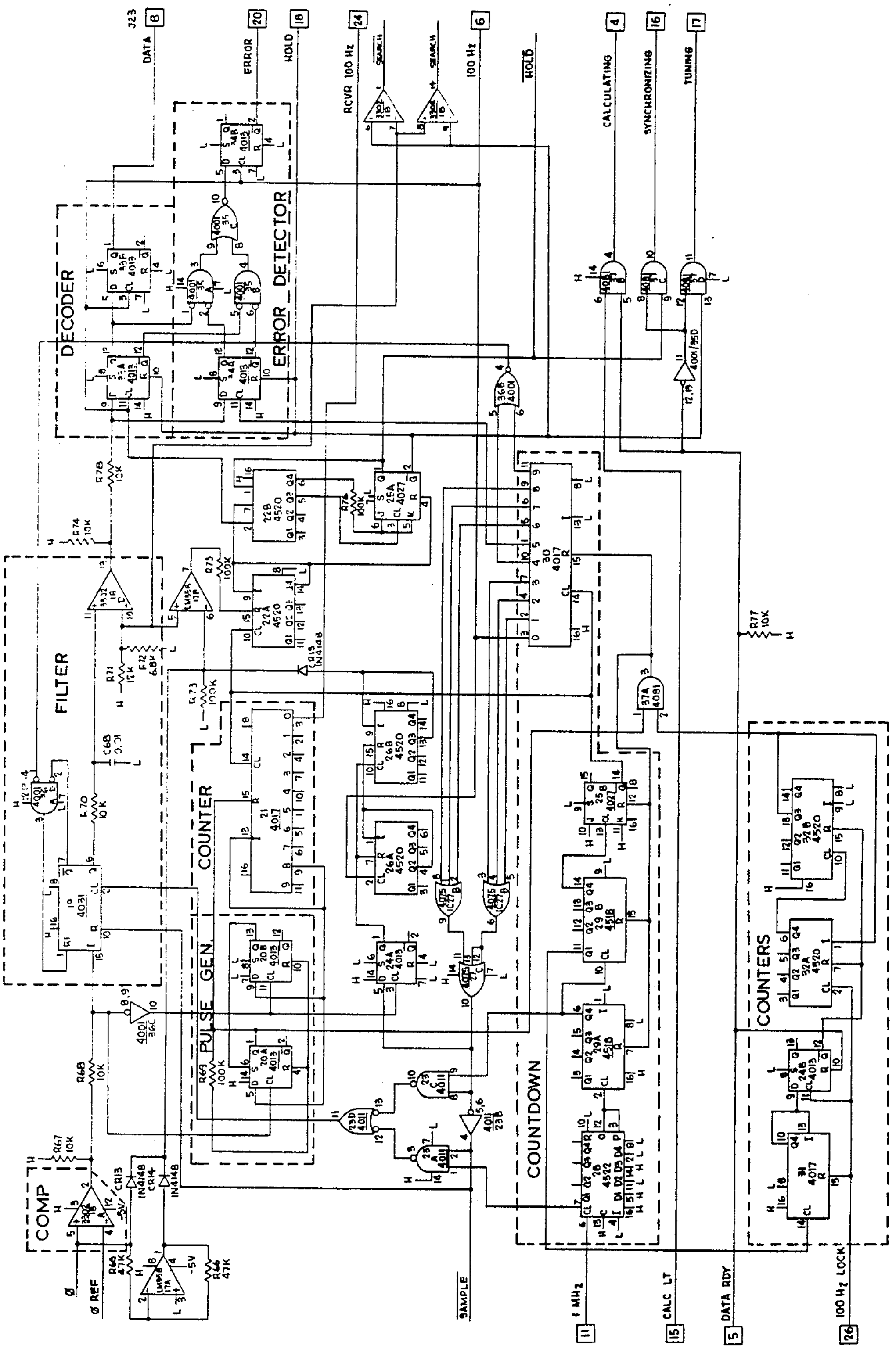
FIG. 9 is an electrical schematic diagram of the data detector and data clock synchronizer thereof.

FIG. 9 shows the circuitry for performing the data and data clock recovery functions. The φ and φREF signals from the phase detector 43 and VCO control sections 46 of FIG. 8 are applied to the input of a comparator IC18A to yield logic level voltage excursions representing the input modulation data pattern. Since the phase modulation data may contain considerable noise, it is necessary to filter the digital output of the comparator IC18A in order to provide reliable digital data. The filter function is accomplished by a recirculating shift register IC19 in combination with RC network R70, C68 and comparator IC18D. Decoding of the Manchester data is performed by the output shift register IC33A and B in concert with the synchronized timing pulses developed in the data clock synchronization circuitry. Decoding errors are detected by IC34 and exclusive-or gate circuitry IC35. The error signal output is utilized by the processor-decoder to eliminate processing errors due to improperly decoded Manchester data.

Data clock synchronization is accomplished by comparison circuitry located on the main logic circuitry operating in response to clock pulses derived from the receiver 100 Hz data transitions and from a 100 Hz clock derived from the reference oscillator of FIG. 7. The 100 Hz data transition pulses, labeled RCVR 100 Hz, are developed from comparator IC18A, pulse generator IC20, and decode counter Ic21. The synchronized 100 Hz clock, labeled 100 Hz, is the output obtained from countdown circuits IC128, IC29, IC25B and IC30. This 100 Hz signal provides the basic timing of the clock time and data circuits.

Figure 10:
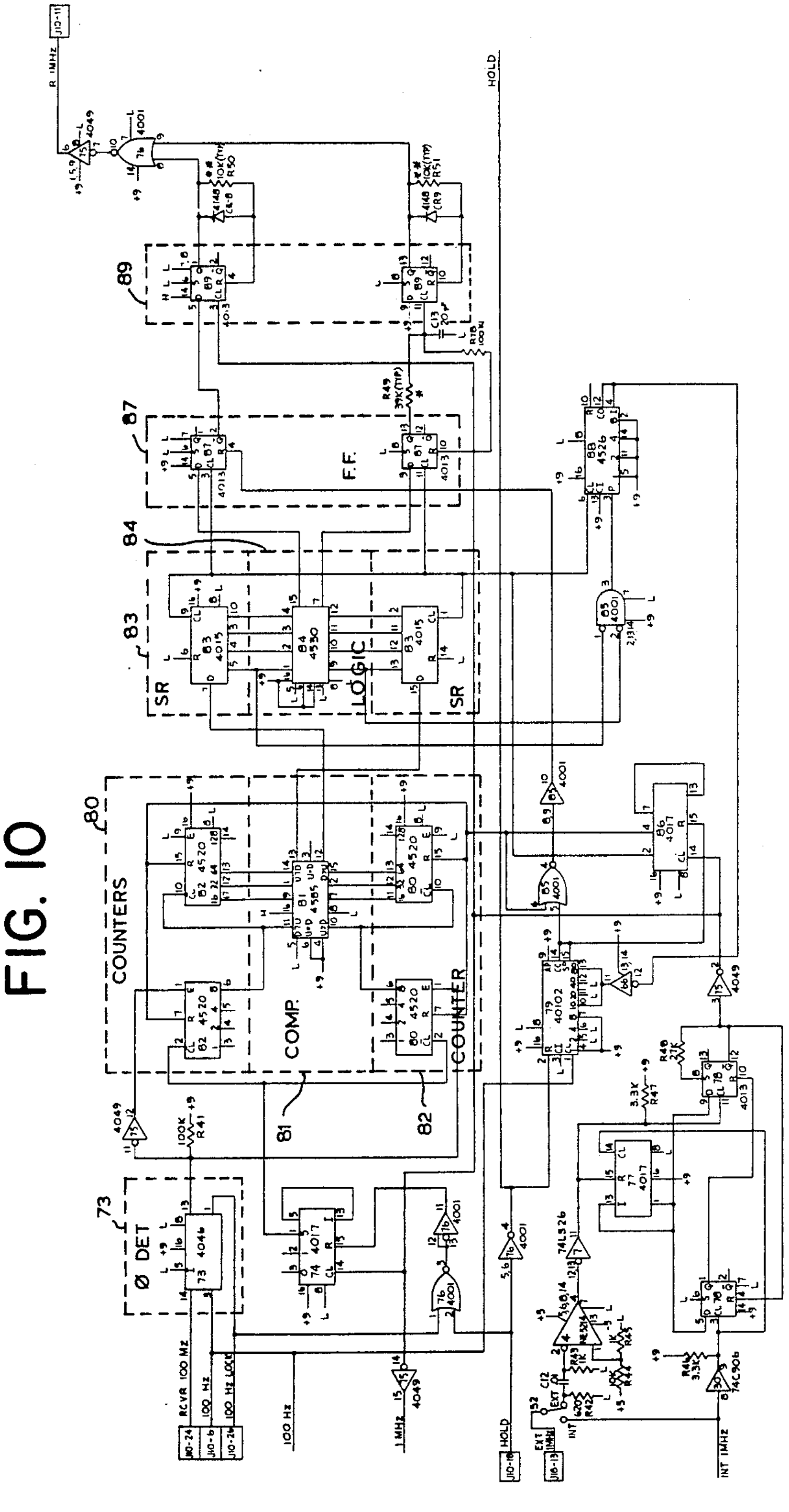
FIG. 10 is an electrical schematic diagram of the phase detector slew control thereof.

Synchronization is achieved in two steps with coarse synchronization to within 100 or 200 microseconds occuring during initialization and secondly close synchronization to within a few microseconds occuring through the operation of the 100 Hz phase detector and slew control of FIG. 10. During the initialization procedure, counter circuits 31, 24B, and 32 activates gate 37A whenever the 100 Hz clock persistently deviates from synchronization with the receiver 100 Hz by more than 500 microseconds. This gate permits direct synchronization to occur by allowing receiver data transition pulses to pass to the reset circuitry of the countdown chain.

100 Hz PHASE DETECTOR AND SLEW CONTROL

Fine synchronization of the 100 Hz clock is achieved by the action of the phase detector and slew control circuit shown in FIG. 10. A phase detector, 73, detects phase differences between the 100 Hz clock and the received 100 Hz from the satellite transmission. The phase difference signals actuate counters 80 and 82 depending upon whether a leading or lagging phase error exists. The phase errors are counted over a 1 second time period and the resulting counter accumulations are compared by comparator 81. If the counts are equal no action occurs. If one counter exceeds the other, then a corresponding output is passed to the shift registers 83. A majority logic circuit 84 monitors the shift register outputs and develops a lead or lag output provided 3 out of 4 of the previous shift register inputs have the same value. The lead or lag outputs actuate D flip-flops 87 and 89 to respectively subtract or add one count to the 1 MHz pulse stream produced at gate 76. The remaining control circuitry provides sampling pulses and internal/external clock reference control.

DATA DECODER AND CONTROL PROCESSOR

Figure 11:
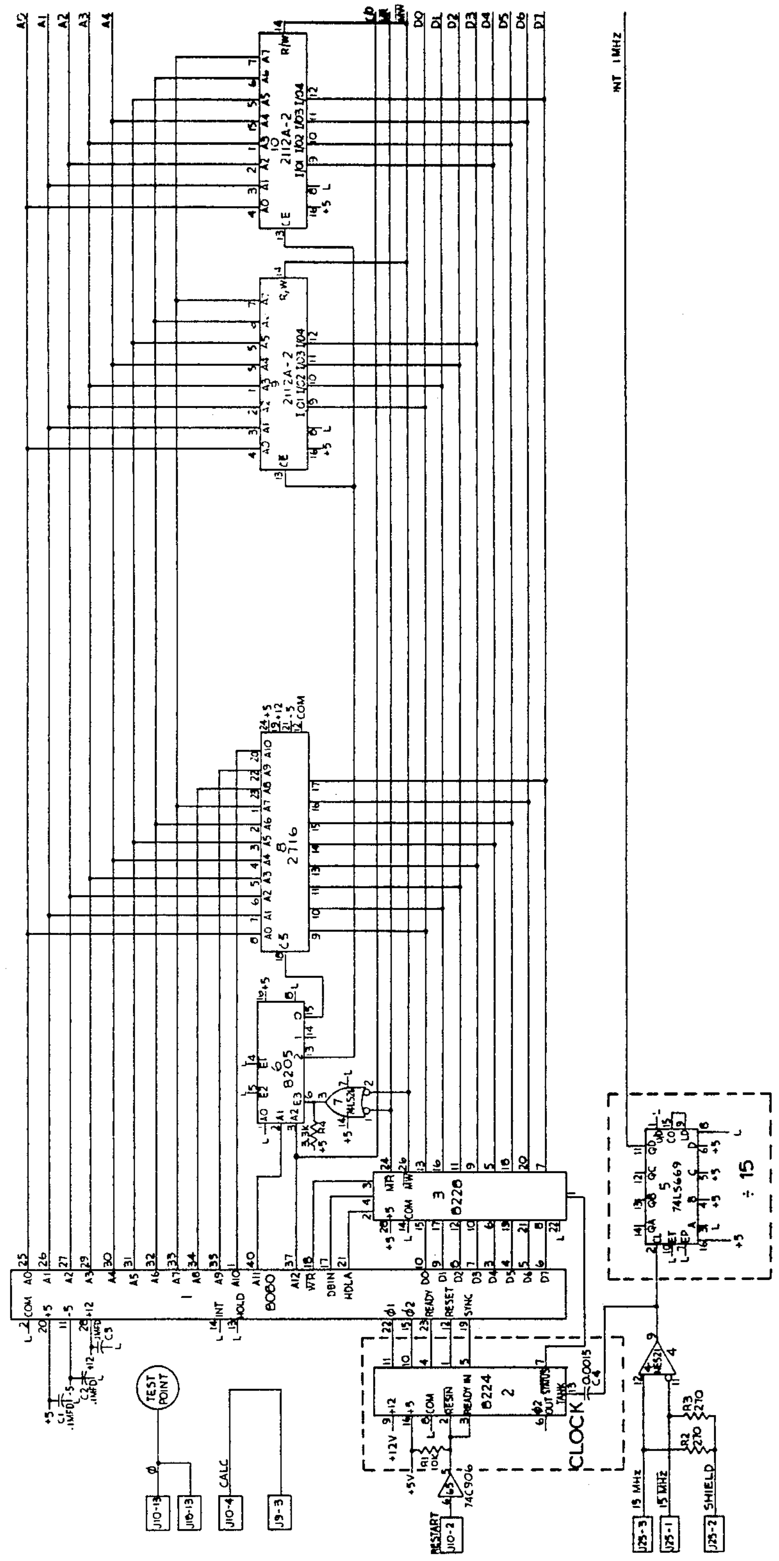
FIG. 11 is an electrical schematic diagram of the processor thereof.
Figure 12:
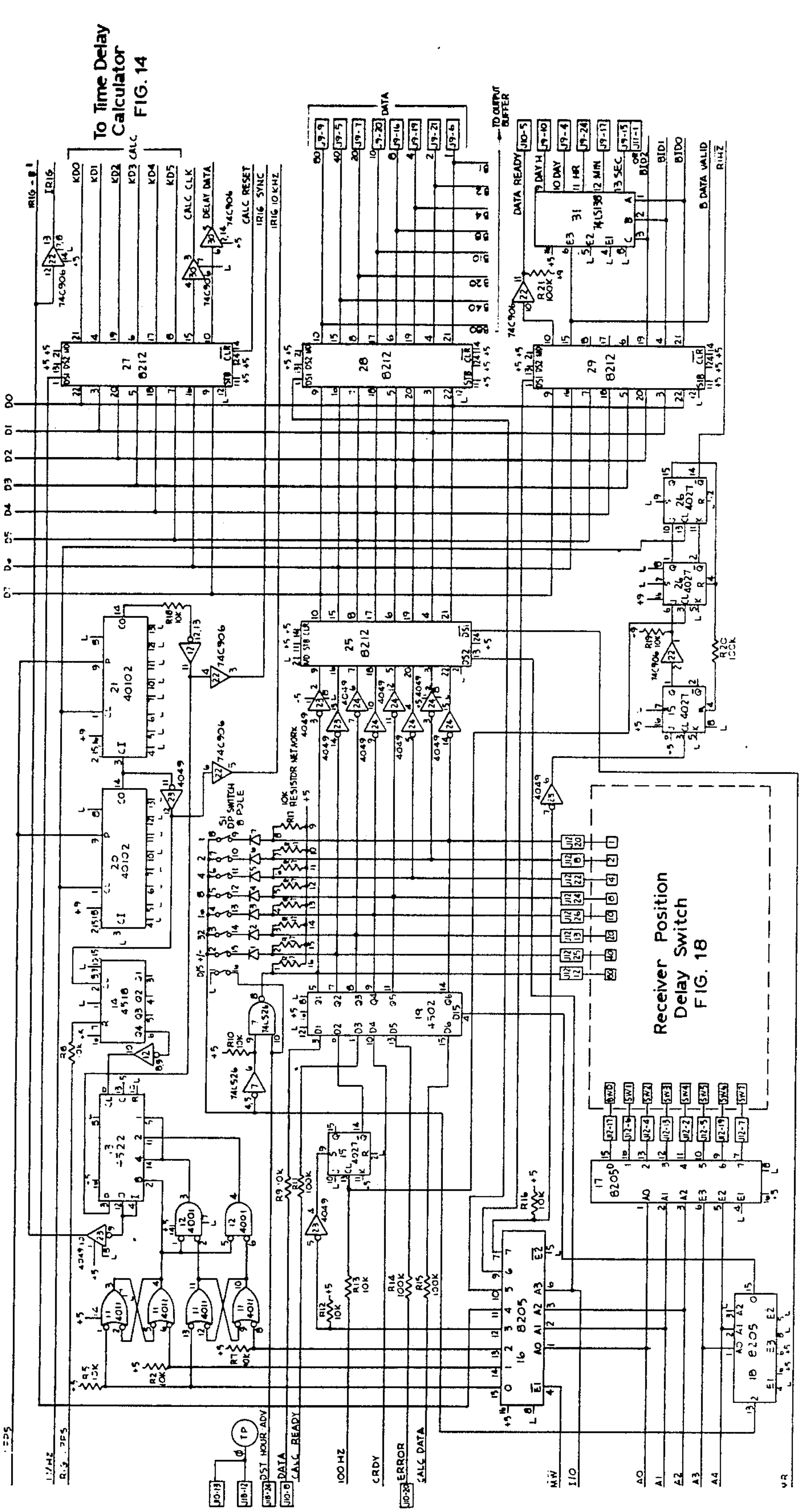
FIG. 12 is an electrical schematic diagram of the processor input and output circuitry thereof.

The data and 100 Hz synchronized data clock produced by the previous circuitry is decoded by the processor circuit shown in FIG. 12 to produce the desired time and calculator control outputs. The received data message is in the form shown in FIG. 2. FIG. 11 shows the processor and memory circuitry and FIG. 12 shows the I/O circuits. Data inputs from the receiver and switch circuitry are entered via IC25. The calculator is driven by output 27 and the time outputs are driven by outputs 28 and 29. The IRIG controls are produced by decoder 16, gates 11 and 12 and counters 13, 14, 20, and 21, of FIG. 12.

The 8080 clock signals are generated by clock generator 2 of FIG. 11 and synchronized to 15 MHz derived from the receiver 30 MHz reference oscillator of FIG. 7. A one MHz reference clock is developed by divide by 15 counter 5 for use by the 100 Hz slew control circuitry.

TIME DELAY CALCULATOR

Figure 13:
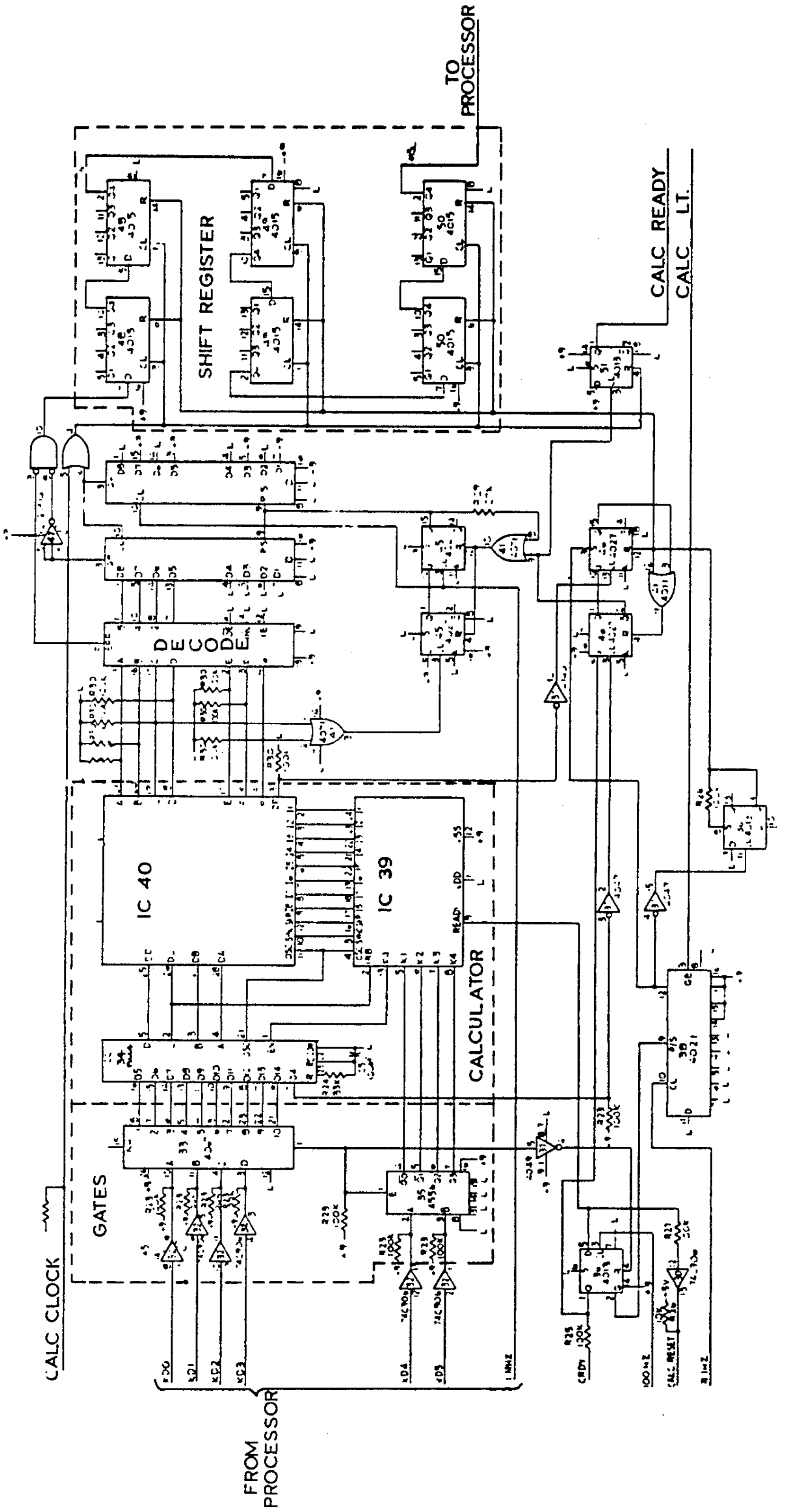
FIG. 13 is an electrical schematic diagram of the time delay calculator thereof.

FIG. 13 shows the time delay calculator. Keying signals for operation of the calculator are developed by gates 33 and 35 in response to commands from the processor section. These signals are applied to the calculator composed of integrated circuits IC34, IC39, and IC40. The calculator output is decoded to BCD digits by decoder circuit 42 and then fed to shift register 48, 49, and 50 for return to the processor, of FIG. 11.

Figure 19:
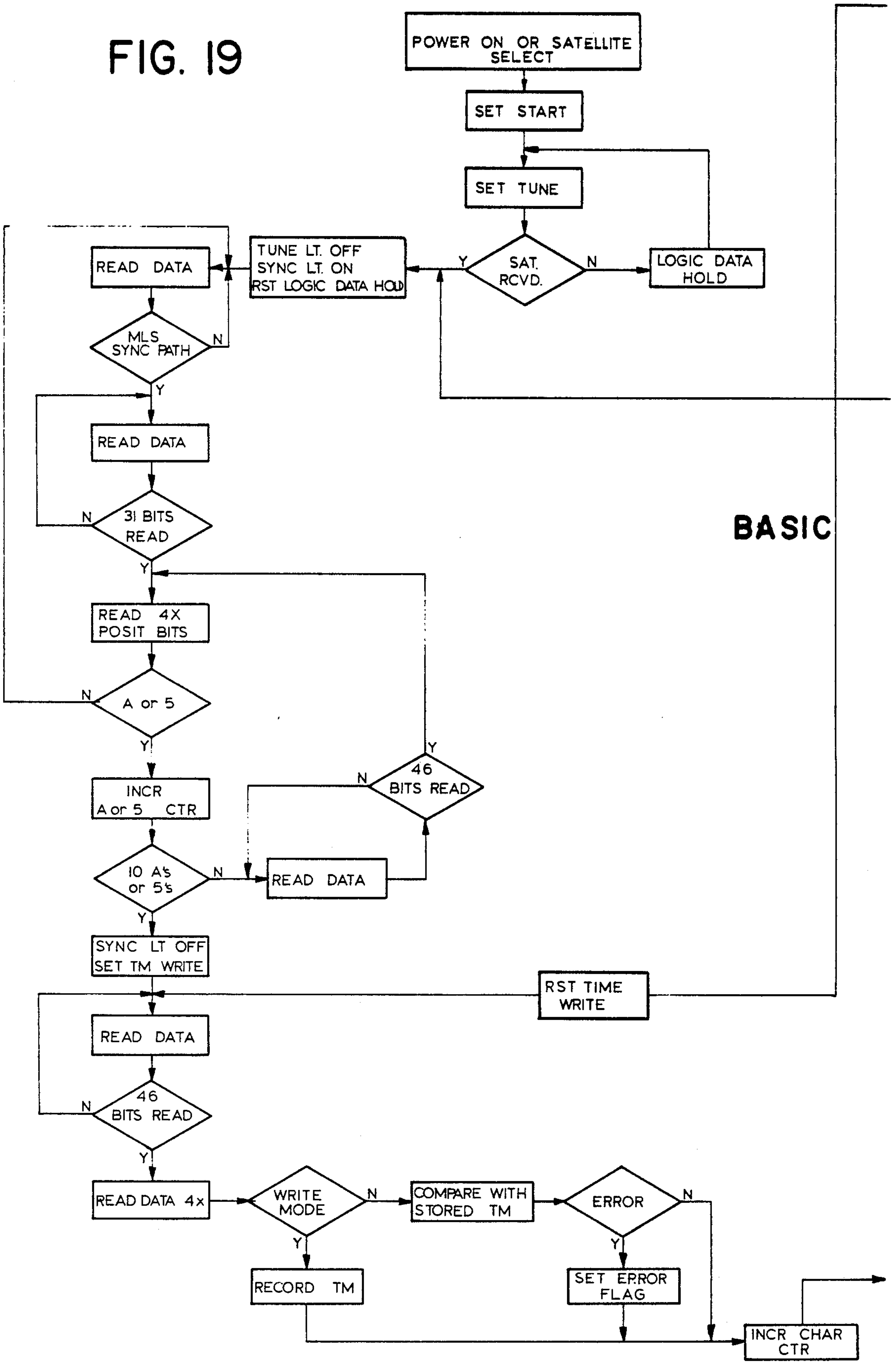
FIGS. 19, 20 and 21 constitute a flow chart for the tuning, synchronization and delay path compensation operation of this invention.
Figure 20:
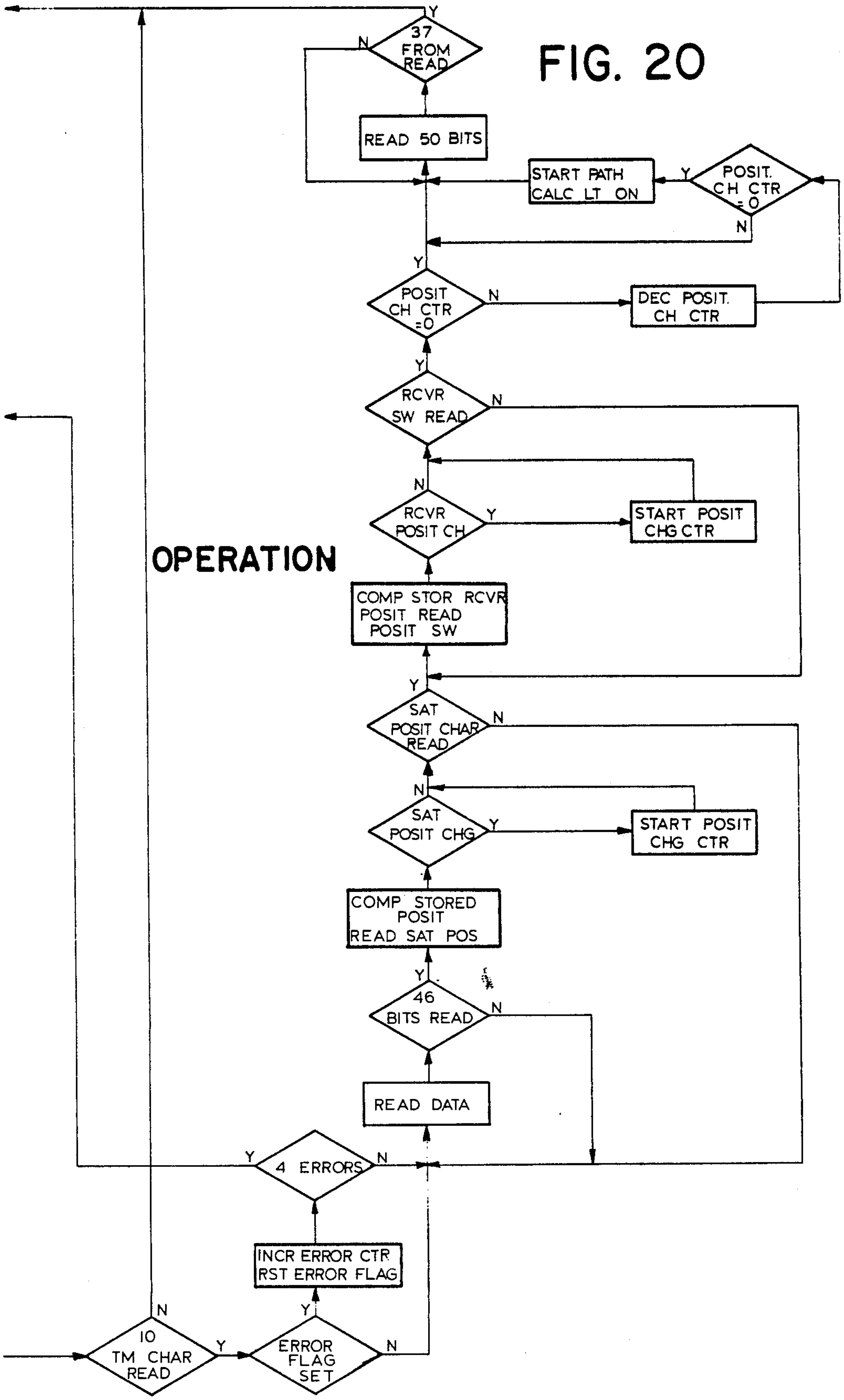
Figures 21, 22:
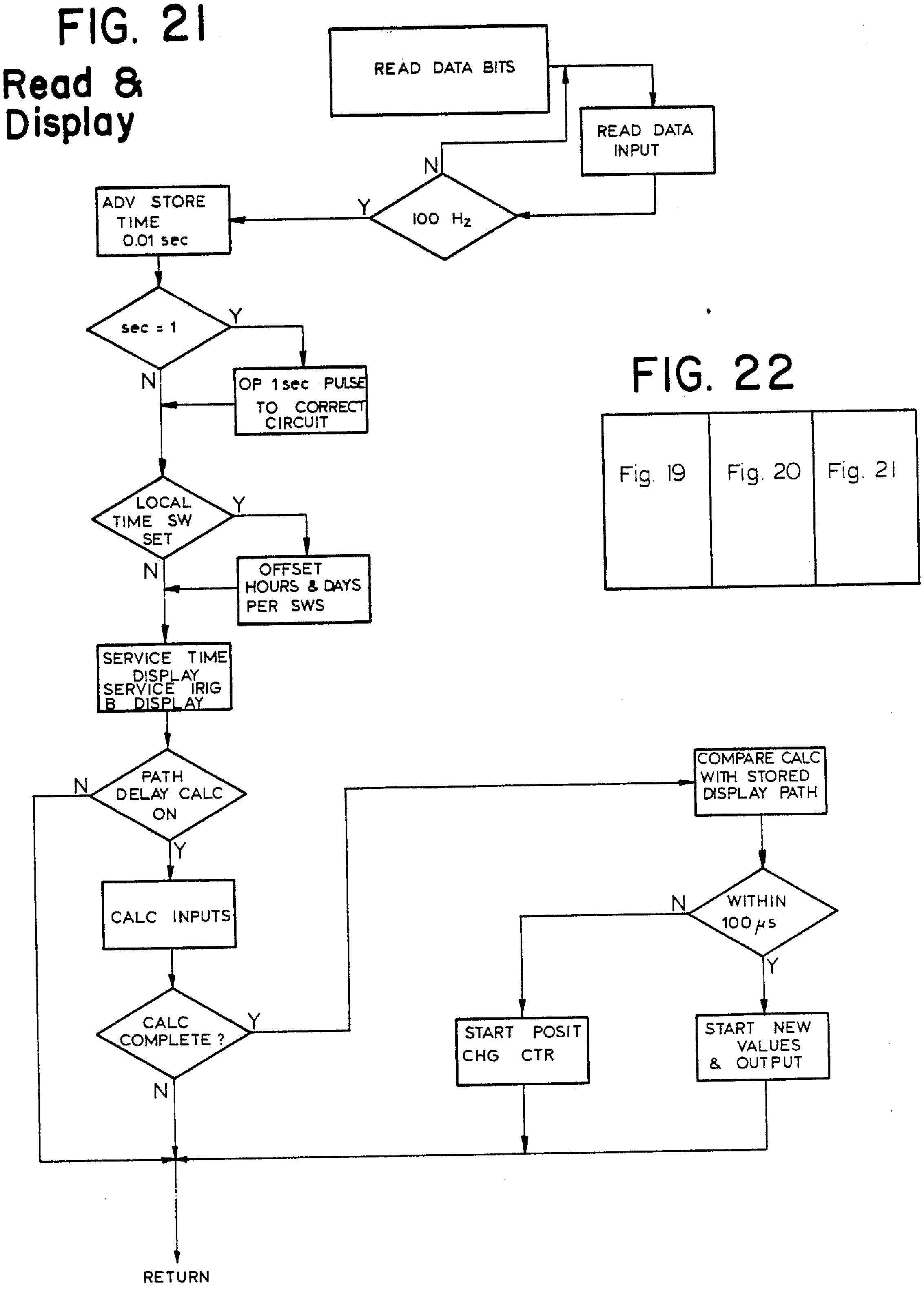
FIG. 22 is an arrangement diagram for FIGS. 19, 20 and 21.

The calculations performed by the time delay calculator of FIG. 13 consistently a part of the program set forth as Appendix A hereof in carrying out the significance of FIGS. 19–21 of the drawing.

TIME DELAY GENERATOR

Figure 14:
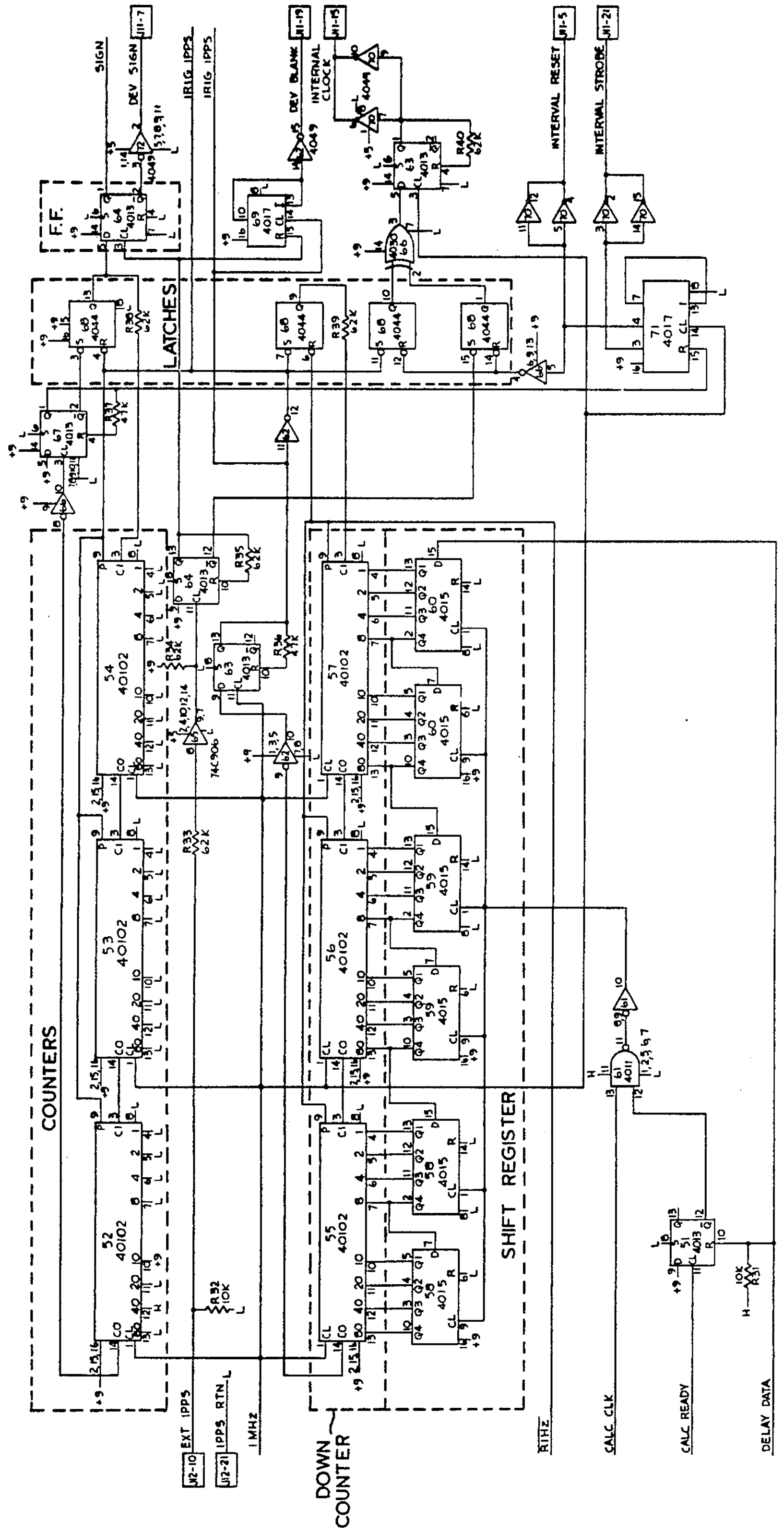
FIG. 14 is an electrical schematic diagram of the time delay counter.

The 1 PPS pulse developed from the satellite signal must be delayed by the amount determined in the path delay calculation. FIG. 14 shows the delay circuitry and includes shift register (IC58, IC59, and IC60) that receives the calculation result from the processor. This number is applied to down-counter IC55, IC56, IC56 each time a satellite derived 1 Hz pulse is received. The down-counter produces an output pulse after counting by the applied number to produce the desired delay corrected 1 PPS signal.

Time difference between an external 1 PPS input and the corrected 1 PPS output is developed by the remaining circuitry. Latches IC68 are operated by the delay corrected 1 PPS and external 1 PPS. Their outputs are applied to exclusive-or gate 66 and flip-flop 64 to produce a 1 MHz pulse train whose duration equals the time difference between the two 1 PPS signals. Counters IC52, IC53, and IC54 and flip-flop 64 produce the time difference sign information. The pulse train and sign signals along with strobe and reset signals are generated for use by the time deviation display.

DISPLAY

Figure 15:
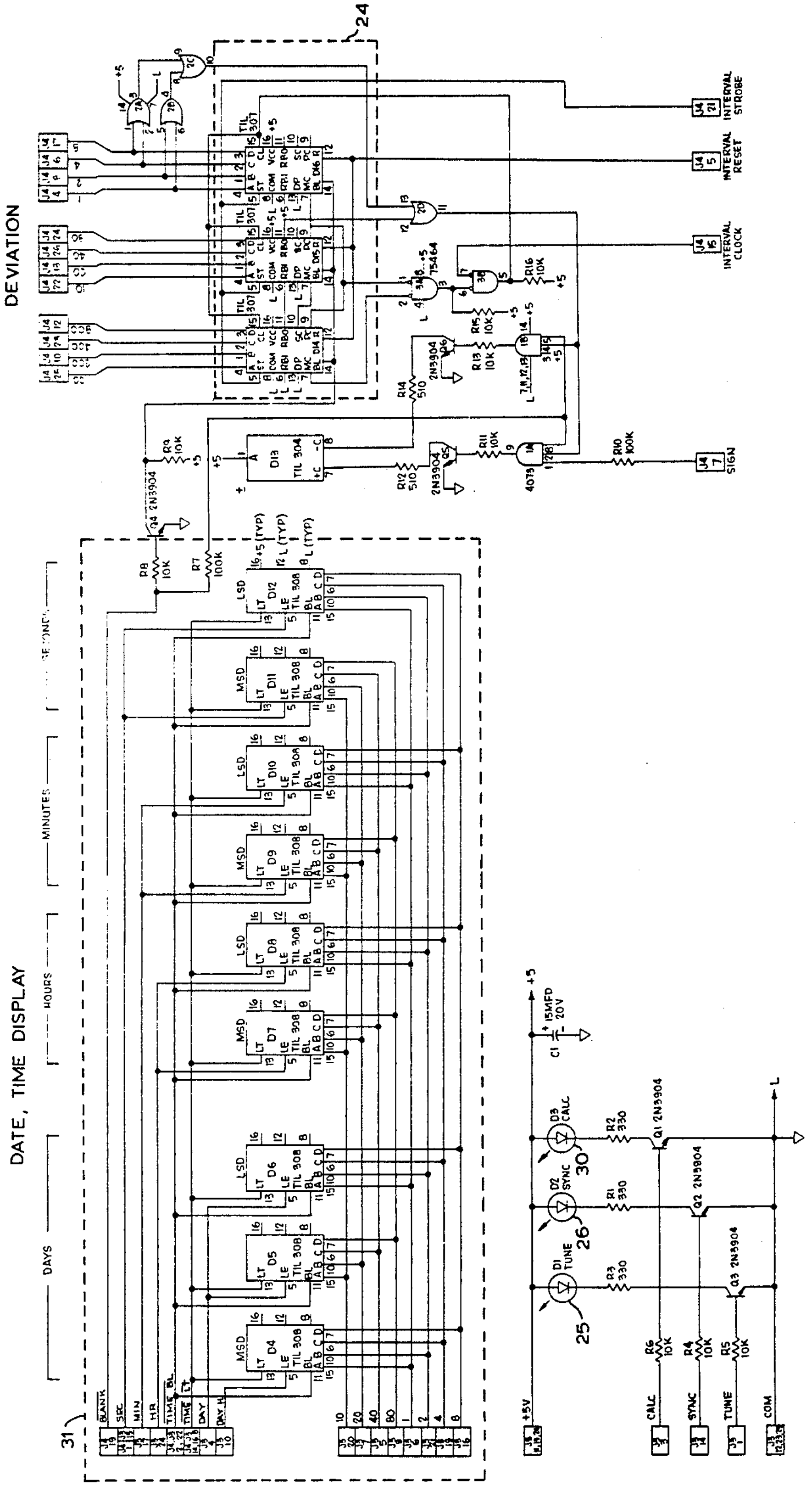
FIG. 15 is an electrical schematic diagram of the display thereof.

FIG. 15 shows the display circuitry. The time digits D4 through D11 contain latches and 7 segment decoders and drivers along with the 7 segment display.

Multiplexed time data from the processor is applied to the time displays D4–D11 and entered into the appropriate display digit according to the time strobe pulses.

A 3-digit display to the right contains decimal counters as well as 7 segment encoders, drivers and display elements for generation and display of the deviation data. The deviation pulse train is counted by the decimal counters to produce the desired output. Gating circuits 3 stop the counting at 999 to indicate over-range if the pulse train is 1 millisecond or longer. Display 31 indicates the sign of the time deviation of the local 1 PPS internal or external reference as compared with corrected satellite 1 PPS signals.

OUTPUT BUFFER

Figure 17:
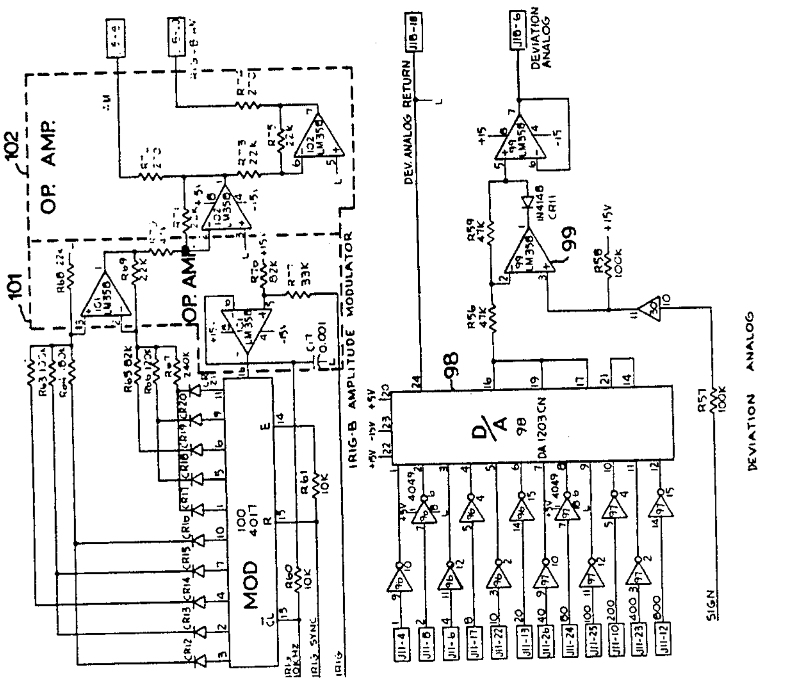
FIG. 17 is an electrical schematic diagram of the IRIG-B amplitude modulator; and deviation analog circuitry.
Figure 16:
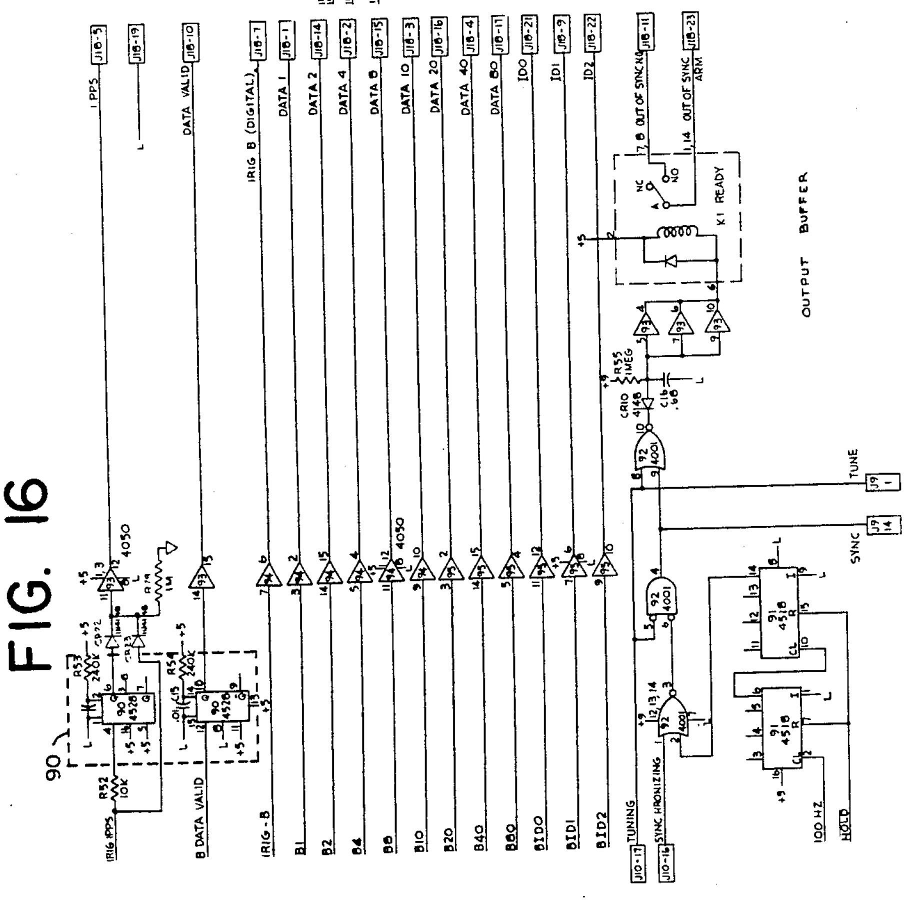
FIG. 16 is an electrical schematic diagram of the output buffer thereof.
Figure 18:
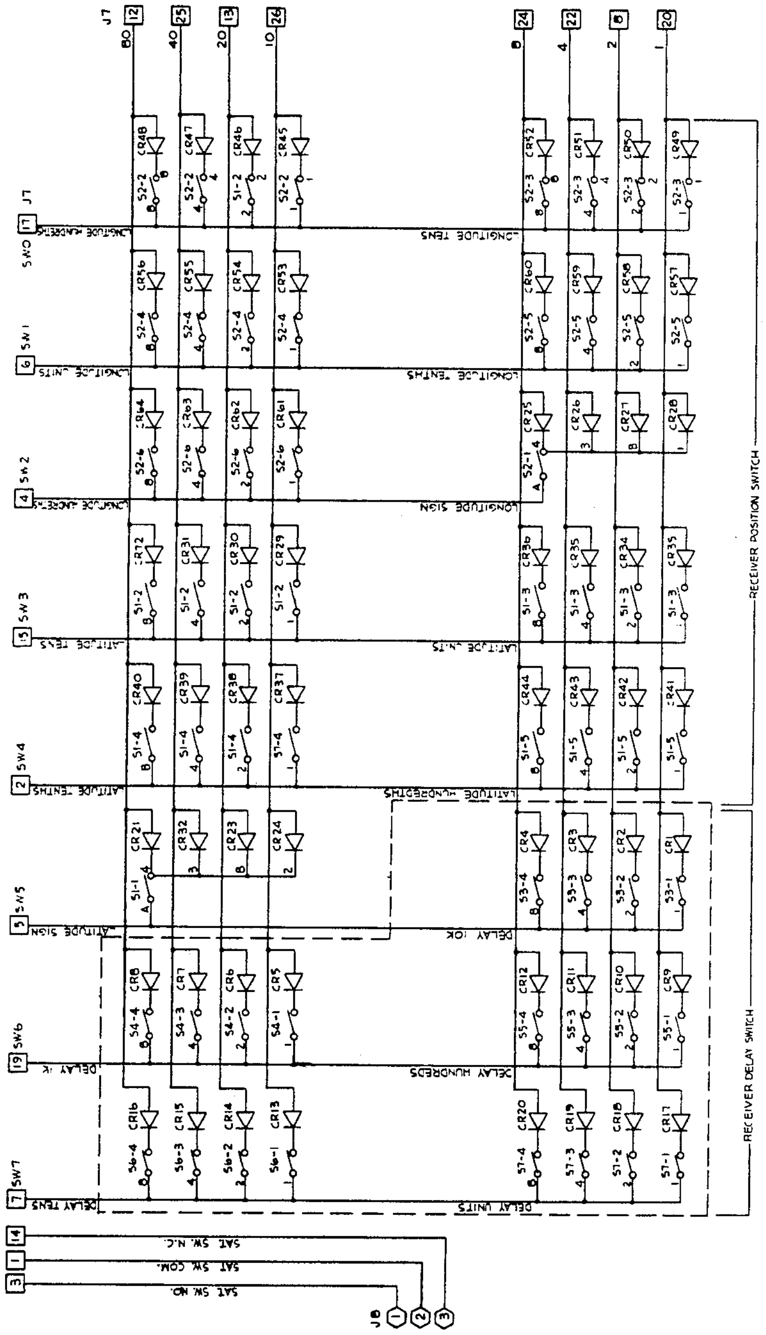
FIG. 18 is an electrical schematic diagram of the receiver position delay switch.

FIGS. 16, and 17 show the output buffer, IRIG-B modulator, and deviation analog circuit respectively. Pulse stretchers 90 of FIG. 16 are used to provide 1 millisecond pulses from the 1 PPS and data valid pulses generated by previous circuitry. The multiplexed time data lines from the processor are buffered to drive the output lines.

Amplitude modulated IRIG-B signals are produced by modulator 100 of FIG. 17 in conjunction with operational amplifiers 101 and 102. A digitally synthesized sine wave with a 3 to 1 amplitude modulation pattern is developed.

Digital to analog converter 98 produces an output proportional to the decimal number developed by the deviation display. Operational amplifier 99 produces a positive output equal to the converter output when the sign data is positive and produces a negative output when the sign data is negative.

OPERATION, TUNING

The receiver is ready to operate once power is supplied and the antenna 15 is connected. It is necessary to set the front panel longitude and latitude switches 21 and 22 to the values representing the receiver location. These may be obtained from an accurate map, and should be determined to 0.01° for maximum accuracy in time recovery. Receiver operation is fully automatic once power is applied and the satellite switch 20 is set to receive the desired satellites 10 or 11, Eastern or Western. Operation of the front panel satellite switch 20 initiates the tuning and synchronization functions and in addition resets the processor controller to accept new data. The status lights 25, 26, and 30 will indicate the particular mode of operation. Initially the Tune light is illuminated and remains "on" during the tuning operation, and the seconds display begins to count seconds. The tuning operation is slow in terms of electronic speed and may require tens of seconds to complete. The tuning operation is illustrated in the flow diagram of FIG. 19.

Referring now to FIG. 19, the first block of flow diagrams involves the initiation of operation by power on or satellite selection, next setting all logic to zero state and then commencing tuning by control voltage of FIG. 6 applied to voltage variable capacitor CR1 of FIG. 6. Automatic tuning involves stepped voltages applied to CR1 of FIG. 6, tunes the VCO to the satellite frequency where the receiver locks to satellite carrier. Meanwhile logic data hold function is performed until tuning is accomplished.

The data hold step is accomplished specifically by an error signal at terminal 20 of FIG. 9. This prevents interpretation of any data appearing in the data channel prior to tuning and synchronization.

OPERATION, SYNCHRONIZATION

The Sync light will illuminate when the tuning function is complete. Clock synchronization occurs during this phase of operation. Again tens of seconds may be required to accomplish synchronization and depends upon successful readout of the satellite synchronization signal. This signal occurs during a 5 second period once each 30 seconds, at zero seconds and at 30 seconds UTC. The receiver ignores data during reception of interfering signals. In areas where interference is frequent it is possible for a number of synchronization periods to pass before successful synchronization occurs. If strong interference is experienced, the Tune light may reappear indicating loss of signal, and the receiver will retune. Synchronization is accomplished in accordance with the flow diagram of FIG. 20 Synchronization is achieved when the Sync and Tune lights 25 and 26 are extinguished. The time display 24 should then indicate the correct time.

Referring again to FIG. 19, after the satellite is received as represented by a yes output of the satellite received decision box, the tune light is extinguished, the sync light is illuminated and logic data hold is reset. The receiver then proceeds to read data bits until the Maximum Length Sequence (MLS) bit sequence. When detected, data is read until 31 more bits have been received and then the receiver begins to read the 4 bit time characters. The receiver looks for A's or 5's until found, and increments or restarts until detecting either 10 A's or 10 5's denoting either a 0 or 30 second time period. When either sequence is detected, the receiver is in synchronism and the sync light is turned off and the time in the internal registers is set.

As FIG. 19 shows at the lower left, the receiver continues to read data. The next 10 characters are time data which are written in the memory setting in the days, hours, minutes and seconds of a comparison step where stored time is performed. After the first cycle, the receiver proceeds to increment through 10 characters without an error flag set (FIG. 20 at bottom).

Next, the receiver continues to read data bits which are the satellite position bits. Satellite position bits are compared with stored satellite position and if a change is registered, the satellite position change counter is initialized. If no change, the receiver proceeds to read the receiver position switches which were set on the face of the instrument. If the receiver change counter is zero, denoting no movement of the receiver, the receiver switch position is read.

The calculate light is illuminated when the position change counter is decremented to zero.

The receiver next reads but does not record the next 37 characters of the satellite signal. These characters are unrelated and so are not used. Reading of the next block of 50 bits including the 37 bits causes resetting of the time write function back at FIG. 19.

Referring again to FIG. 20, bottom if in reading time characters, four successive errors are noted, denoting probable loss of synchronization, the synchronization step is again initiated from the 4 error decision box at the Sync Light On box of FIG. 19.

CALCULATION ERROR CORRECTION

The procesor of FIG. 11 senses calculation errors. In the rare event that such an error occurs the processor will reinitiate the delay calculation after approximately one minute and again check the results for errors. If necessary the calculation will be repeated until a satisfactory result is obtained. Similarily, if incorrect time is displayed after initialization, the error will be detected during data comparison with the satellite time messages. The initialization procedure is automatically restarted to correct the error if is persists for more than 4 satellite time messages.

The clock 1 PPS output normally will be on time or within tens of microseconds of satellite time immediately after initialization is complete. Under some conditions, however, there can be as much as 300 or 400 microseconds time differences at this point in the operation, and additional time should be allowed for corrective actions to take place. The correction circuitry is designed to slew the local clock into agreement with satellite time at the rate of 1 microsecond per second (10 microseconds per second for large discrepancies and in the absence of interference). Thus some 300 or 400 seconds may be required to reduce the error to zero.

From time to time the Sync light may blink indicating an interference condition. The circuitry is arranged to transfer clock operation to the standby mode during the interference period. Clock slew controls and satellite data decoding functions are disabled in the standby mode.

LOCAL TIME SET

UTC time as received from the satellite can be offset in the receiver to yield local time by setting the offset value into the Local Time Switch, Sl, and Daylight Savings Time Switch, D/S of FIG. 12.

Switch settings for switches Sl and D/S of FIG. 12 are determined by considering the local time zone in relation to the UTC reference zone through the Greenwich meridian. For example, Los Angeles is located in standard time zone U (Pacific Standard Time) which is −8 hours from the UTC zone. The operator sets the switches so that the values associated with the "on" switches when added equal the number of hours time difference. In this case the 5th switch with a value of 8 is turned "on" and the others turned "off". Since the hours are to be subtracted, the sign switch must be in the "off" position. If Daylight Saving Time is in effect the first switch should be "off", and if it is not in effect the switch should be "on". It is necessary to set the Daylight Saving switch to the "off" position if remote operation of this feature is desired.

OPERATION, CALCULATION

The path delay calculation is initiated after the synchronization function is complete. Calculation begins either at 16.5 seconds or at 46.5 seconds depending upon whether synchronization occured on the minute or half minute. The Calc light 30 will illuminate during the approximately 40 seconds time required to perform the path delay computation. Initialization is complete when the calculation period ends.

Calculation of delay path is in accordance with the flow diagram of FIG. 21. Referring now to FIG. 21, whenever the data read function is performed, the delay path calculation is performed. Data is read and whenever the 100 Hz clock appears the receiver advances the stored time in the registers by 0.01 seconds. Next, the receiver checks to see if the second's digit is one, and when it occurs a 1 second pulse is outputted.

The next decision is whether local time switches are set. If so, the offset for local time (zone and daylight savings time) is introduced into the time display values which are then displayed. The IRIG B output is additionally serviced.

Delay path calculation is next commenced, completed and compared with the previous stored value of path delay. If within 100 micro seconds of the previous value, the new value is stored and outputted. If greater then 100 micro seconds, the calculation decision is followed by initiation of the position change counter to start the calculation again.

Figure 1B:
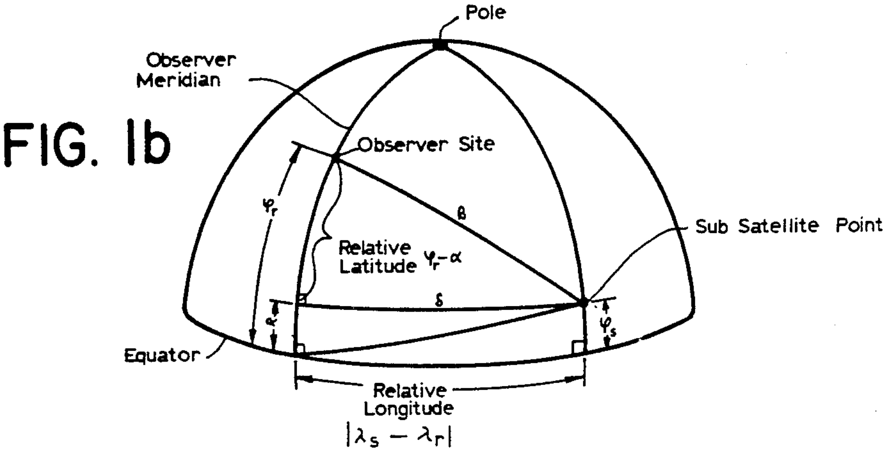

The actual calculation of path delay involves the solution of the geometric relationships illustrated in FIGS. 1*a* and 1*b* employing the calculator of FIG. 11. It is performed as a part of the calculations made by the type 8080 calculator chip of FIG. 1 in carrying out the program of Appendix A.

SUMMARY

One may see that we have invented a satellite responsive time receiver which is capable of scanning for GEOS Satellite Signals, synchronizing with such signals, tracking the signal, automatically computing the signal path delay given the receiver position coordinates, compensating for the delay and displaying the corrected time. The receiver is further capable of introducing a correction for local and daylight time and for maintaining local internal clock time display during periods of loss of satellite signal. The receiver further provides an external 1 MHz clock signal and further compares satellite 1 pulse per second signals with similar local signals and displays any deviation. Thus a complete virtually automatic satellite clock is disclosed.

The above described embodiments of this invention are merely descriptive of its principles and are not to be considered limiting. The scope of this invention instead shall be determined from the scope of the following claims, including their equivalents.

```
                        ;
                        ;PROGRAM ADDRESSES
66F0                    MLIST    EQU      66F0H
6891                    IRIGD    EQU      25600+1169
6892                    LTIME    EQU      25600+1170
6810                    TIME     EQU      25600+1040
6817                    SPOS     EQU      25600+1047
6824                    RPOS     EQU      25600+1060
6865                    DATA     EQU      25600+1125
```

```
                 ;PROGRAM ADDRESSES
682E             RPOS1   EQU     25600+1070
680A             CALCD   EQU     25600+1034
684C             CNTR    EQU     25600+1100
6856             FLAG    EQU     25600+1110
6C7D             CALCL   EQU     26624+1149
6C7E             CALC1   EQU     26624+1150
6C87             RECAL   EQU     26624+1159
6C88             CALC2   EQU     26624+1160
7000             INPUT   EQU     26624+2048
7004             CALC    EQU     26624+2052
7005             DISP    EQU     26624+2053
7007             ONEHZ   EQU     26624+2055
7008             SW      EQU     26624+2056
7010             LSW     EQU     26624+2064
                 ;
6000                     ORG     24576
6000 31FF68      START:  LXI     SP,25600+1279
6003 215A68              LXI     H,FLAG+4
6006 AF                  XRA     A
6007 77                  MOV     M,A
6008 23                  INX     H
6009 77                  MOV     M,A
600A 216F68              LXI     H,DATA+10
600D 77                  MOV     M,A
600E 23                  INX     H
600F 77                  MOV     M,A
6010 01876C              LXI     B,RECAL
6013 3C                  INR     A
6014 02                  STAX    B
6015 CD0562      DITTO:  CALL    WAIT
6018 210070              LXI     H,INPUT
601B 7E                  MOV     A,M
601C E680                ANI     10000000B ;SERIAL STORAGE OF INPUT BITS
601E 47                  MOV     B,A
601F 216F68              LXI     H,DATA+10
6022 7E                  MOV     A,M
6023 E67F                ANI     127
6025 B0                  ORA     B
6026 1F                  RAR
6027 77                  MOV     M,A
6028 23                  INX     H
6029 7E                  MOV     A,M
602A 1F                  RAR
602B 119175              LXI     D,0111010110010001B
602E BB                  CMP     E          ;MLS SYNC TEST
602F 77                  MOV     M,A
6030 C21560              JNZ     DITTO
6033 2B                  DCX     H
6034 7E                  MOV     A,M
6035 BA                  CMP     D
6036 C21560              JNZ     DITTO
6039 214D68              LXI     H,CNTR+1
603C 360A                MVI     M,10
603E 23                  INX     H          ;SKIP 31 BITS BETWEEN MLS SYNC
603F 361F                MVI     M,31       ;AND BCD CHARACTER
6041 CD4C60              CALL    MORE
6044 C35D60              JMP     SYNC
6047 214E68      FRAME:  LXI     H,CNTR+2
604A 362E                MVI     M,46
604C CD0562      MORE:   CALL    WAIT
604F 214E68              LXI     H,CNTR+2
6052 35                  DCR     M
6053 C24C60              JNZ     MORE
6056 CDDB61              CALL    LOAD4
6059 C9                  RET
605A CD4760      AGAIN:  CALL    FRAME
605D 3EA0        SYNC:   MVI     A,10100000B
605F 216568              LXI     H,DATA
6062 BE                  CMP     M
6063 CA6F60              JZ      GO
6066 3E50                MVI     A,01010000B
6068 BE                  CMP     M
6069 CA6F60              JZ      GO
606C C31560              JMP     DITTO
```

```
606F 214D68   GO:     LXI   H,CNTR+1
6072 35               DCR   M
6073 C25A60           JNZ   AGAIN
6076 215B68           LXI   H,FLAG+5 ;CODE SYNC ACHIEVED IF HERE
6079 3601             MVI   M,1      ;SET CODE SYNC FLAG
607B 211068           LXI   H,TIME   ;SET TIME TO 4.58 SECONDS TO
607E 3658             MVI   M,01011000B ;ALLOW FOR CODE SYNC
6080 23               INX   H        ;AND RECEIVER DELAY
6081 3604             MVI   M,4
6083 214F68           LXI   H,CNTR+3 ;RESET ERROR COUNTER
6086 AF               XRA   A
6087 77               MOV   M,A
6088 23               INX   H        ;SET POSITION CHANGE COUNTER
6089 3C               INR   A
608A 77               MOV   M,A
608B 215668           LXI   H,FLAG   ;SET WRITE FLAG
608E 77               MOV   M,A
608F 211168   TOY:    LXI   H,TIME+1 ;INITIALIZE TIME READ
6092 224C68           SHLD  CNTR
6095 215768           LXI   H,FLAG+1 ;SET HL FLAG
6098 3601             MVI   M,1
609A 23               INX   H
609B 3600             MVI   M,0      ;RESET ERROR FLAG
609D CD4760   RPT:    CALL  FRAME
60A0 2A4C68           LHLD  CNTR
60A3 7D               MOV   A,L
60A4 FE16             CPI   TIME+6 AND 0FFH
60A6 DA0C61           JC    HILO     ;TEST FOR 10 CHARACTERS
60A9 215868           LXI   H,FLAG+2 ;TEST FOR ERROR
60AC 3E80             MVI   A,128
60AE A6               ANA   M
60AF FE80             CPI   128
60B1 CAC160           JZ    SAT
60B4 AF               XRA   A
60B5 3C               INR   A
60B6 A6               ANA   M
60B7 FE01             CPI   1
60B9 CA6961           JZ    ERR
60BC 214F68           LXI   H,CNTR+3 ;RESET ERROR COUNTER
60BF AF               XRA   A
60C0 77               MOV   M,A
60C1 2A4C68   SAT:    LHLD  CNTR     ;TEST FOR 13 CHARACTERS READ
60C4 7D               MOV   A,L
60C5 FE24             CPI   SPOS+13 AND 0FFH
60C7 DA7661           JC    READ
60CA 010870           LXI   B,SW
60CD 115068           LXI   D,CNTR+4
60D0 FE2C     SWT:    CPI   RPOS+8 AND 0FFH ;TEST FOR 8 SWITCHES READ
60D2 C2B661           JNZ   SWCH
60D5 211768           LXI   H,SPOS   ;TEST SATELLITE 0 DATA
60D8 7D       ZEROT:  MOV   A,L
60D9 FE23             CPI   SPOS+12 AND 0FFH
60DB CAE760           JZ    CALCS
60DE AF               XRA   A
60DF BE               CMP   M
60E0 C2EB60           JNZ   CALFL
60E3 23               INX   H
60E4 C3D860           JMP   ZEROT
60E7 EB       CALCS:  XCHG
60E8 3602             MVI   M,2
60EA EB               XCHG
60EB 215A68   CALFL:  LXI   H,FLAG+4 ;TEST CALCULATOR FLAG FOR 0
60EE AF               XRA   A
60EF BE               CMP   M
60F0 CAC961           JZ    POSCT
60F3 215168   FRMCT:  LXI   H,CNTR+5 ;INITIALIZE FRAME COUNTER
60F6 3624             MVI   M,36
60F8 CD4760   FRM:    CALL  FRAME
60FB 215168           LXI   H,CNTR+5
60FE 35               DCR   M
60FF AF               XRA   A
6100 BE               CMP   M
6101 C2F860           JNZ   FRM      ;37 FRAME TEST
6104 215668           LXI   H,FLAG   ;RESET WRITE FLAG
6107 3600             MVI   M,0
6109 C38F60           JMP   TOY
```

```
6100 015768   HILO:  LXI    B,FLAG+1 ;TEST FOR 0
610F 116568          LXI    D,DATA
6112 0A              LDAX   B
6113 FE00            CPI    0
6115 CA5B61          JZ     LO
6118 AF              XRA    A        ;SET HILO = 0
6119 02              STAX   B        ;INCREMENT TIME ADDRESS
611A 23              INX    H
611B 224C68          SHLD   CNTR
611E 2B              DCX    H
611F 1A              LDAX   D
6120 4F              MOV    C,A
6121 E6F0            ANI    240
6123 12              STAX   D
6124 3E0F            MVI    A,15     ;COMPARE DATA WITH MEMORY
6126 A6       TEST:  ANA    M
6127 EB              XCHG
6128 B6              ORA    M
6129 47              MOV    B,A
612A 79              MOV    A,C      ;DIGIT ERROR CHECK
612B E608            ANI    8
612D FE08            CPI    8
612F CA5161          JZ     RPT1
6132 78              MOV    A,B
6133 EB              XCHG
6134 BE              CMP    M
6135 EB              XCHG
6136 215868          LXI    H,FLAG+2
6139 CA4061          JZ     WRITE
613C 3E01            MVI    A,1      ;SET ERROR FLAG
613E B6              ORA    M
613F 77              MOV    M,A
6140 2B       WRITE: DCX    H
6141 2B              DCX    H
6142 AF              XRA    A
6143 BE              CMP    M        ;TEST WRITE FLAG FOR 0
6144 CA9D60          JZ     RPT      ;GET NEXT TIME CHARACTER
6147 EB              XCHG
6148 70              MOV    M,B      ;WRITE NEW TIME IN RAM CLOCK
6149 214F68          LXI    H,CNTR+3 ;RESET ERROR COUNT
614C AF              XRA    A
614D 77              MOV    M,A
614E C39D60          JMP    RPT
6151 215868   RPT1:  LXI    H,FLAG+2
6154 3E80            MVI    A,128
6156 B6              ORA    M
6157 77              MOV    M,A
6158 C39D60          JMP    RPT
615B 3C       LO:    INR    A        ;SET HILO=1
615C 02              STAX   B
615D 1A              LDAX   D
615E 4F              MOV    C,A
615F 1F              RAR
6160 1F              RAR
6161 1F              RAR
6162 1F              RAR
6163 12              STAX   D
6164 3EF0            MVI    A,11110000B
6166 C32661          JMP    TEST
6169 214F68   ERR:   LXI    H,CNTR+3 ;INCR ERROR COUNTER AND TEST
616C 34              INR    M        ;FOR FOUR ERRORS
616D 3E04            MVI    A,4
616F BE              CMP    M
6170 CA0060          JZ     START
6173 C3C160          JMP    SAT
6176 116568   READ:  LXI    D,DATA   ;READ COMPARE AND WRITE 13
6179 1A              LDAX   D        ;SATELLITE POSITION CHARACTERS
617A E608            ANI    8
617C FE08            CPI    8        ;DIGIT ERROR CHECK
617E CA9961          JZ     NFR
6181 1A              LDAX   D
6182 E6F0            ANI    240
6184 0F              RRC
6185 0F              RRC
6186 0F              RRC
6187 0F              RRC
```

```
6188 47                  MOV     B,A
6189 215668              LXI     H,FLAG
618C AF                  XRA     A
618D BE                  CMP     M
618E 2A4C68              LHLD    CNTR
6191 C2B261              JNZ     SATWR
6194 78                  MOV     A,B
6195 BE                  CMP     M          ;TEST NEW CHARACTER = OLD
6196 C2A361              JNZ     CPOS1
6199 23         NFR:     INX     H
619A 224C68              SHLD    CNTR
619D CD4760              CALL    FRAME
61A0 C3C160              JMP     SAT
61A3 EB         CPOS1:   XCHG
61A4 215068              LXI     H,CNTR+4   ;INITIALIZE POSITION CHANGE
61A7 3602                MVI     M,2        ;COUNTER
61A9 215A68              LXI     H,FLAG+4
61AC AF                  XRA     A
61AD BE                  CMP     M          ;TEST CALCULATOR ON FLAG FOR 0
61AE EB                  XCHG
61AF C29961              JNZ     NFR
61B2 70         SATWR:   MOV     M,B        ;LOAD NEW SATELLITE POSITION
61B3 C39961              JMP     NFR        ;INTO MEMORY
61B6 0A         SWCH:    LDAX    B
61B7 BE                  CMP     M          ;TEST SWITCH VS PREVIOUS VALUE
61B8 C2C161              JNZ     CPOS
61BB 23         INC:     INX     H
61BC 03                  INX     B
61BD 7D                  MOV     A,L
61BE C3D060              JMP     SWT
61C1 77         CPOS:    MOV     M,A
61C2 EB                  XCHG
61C3 3602                MVI     M,2        ;SET POSITION CHANGE CNTR = 2
61C5 EB                  XCHG
61C6 C3BB61              JMP     INC
61C9 EB         POSCT:   XCHG
61CA BE                  CMP     M
61CB CAF360              JZ      FRMCT
61CE 35                  DCR     M          ;TEST POSITION CHANGE CNT FOR 0
61CF BE                  CMP     M          ;AFTER PREVIOUS CHANGE
61D0 C2F360              JNZ     FRMCT
61D3 215968              LXI     H,FLAG+3
61D6 3601                MVI     M,1        ;SET POSITION CHANGE FLAG
61D8 C3F360              JMP     FRMCT
61DB 216568     LOAD4:   LXI     H,DATA     ;INITIALIZE FOR SERIAL SHIFT OF
61DE 3608                MVI     M,8        ;4 INPUT DATA BITS
61E0 2B                  DCX     H
61E1 3600                MVI     M,0
61E3 CD0562     LNXT:    CALL    WAIT
61E6 110070              LXI     D,INPUT
61E9 1A                  LDAX    D
61EA E608                ANI     8
61EC FE08                CPI     8          ;BIT ERROR TEST
61EE 216468              LXI     H,DATA-1
61F1 C2F561              JNZ     BITL
61F4 77                  MOV     M,A
61F5 1A         BITL:    LDAX    D
61F6 E680                ANI     128
61F8 23                  INX     H
61F9 B6                  ORA     M
61FA 1F                  RAR
61FB 77                  MOV     M,A
61FC D2E361              JNC     LNXT       ;TEST FOR CARRY RESULTING FROM
61FF 07                  RLC                ;SHIFT OF INITIAL 1 IN BIT 4
6200 2B                  DCX     H
6201 B6                  ORA     M
6202 23                  INX     H
6203 77                  MOV     M,A
6204 C9                  RET
6205 210370     WAIT:    LXI     H,INPUT+3
6208 7E                  MOV     A,M        ;LOOK FOR 100HZ
6209 17                  RAL
620A 17                  RAL
620B D20562              JNC     WAIT       ;JUMP TO WAIT IF 100HZ ABSENT
620E 77                  MOV     M,A        ;RESET 100HZ
620F 215968              LXI     H,FLAG+3
```

```
6212 AF                  XRA    A
6213 BE                  CMP    M          ;TEST POSITION CHANGE FLAG
6214 C21963              JNZ    CALIN
6217 23                  INX    H
6218 BE                  CMP    M          ;TEST CALCULATOR ON FLAG
6219 CA9864              JZ     COUNT
621C 210070              LXI    H,INPUT
621F 3E10                MVI    A,00010000B
6221 A6                  ANA    M
6222 FE00                CPI    0          ;TEST CALCULATOR READY
6224 CA9864              JZ     COUNT
6227 015F68              LXI    B,FLAG+9
622A 0A                  LDAX   B
622B FE00                CPI    0          ;TEST FOR CALCULATOR READ
622D C25163              JNZ    KEYST
6230 3E20                MVI    A,32
6232 A6                  ANA    M
6233 FE00                CPI    0          ;TEST CALCULATOR OUTPUT READY
6235 CA9864              JZ     COUNT
6238 015A68              LXI    B,FLAG+4
623B 0A                  LDAX   B
623C FE02                CPI    2          ;TEST FOR FIRST CALCULATION
623E C29062              JNZ    READ2
6241 217E6C              LXI    H,CALC1
6244 110470     READC:   LXI    D,CALC
6247 017D6C              LXI    B,CALCL
624A 3E03                MVI    A,3
624C 02         WORD:    STAX   B          ;READ 3X8 BITS CALCULATOR DATA
624D FE00                CPI    0          ;TEST IF 24 BITS READ
624F C26462              JNZ    BITLD
6252 015A68              LXI    B,FLAG+4
6255 0A                  LDAX   B
6256 FE01                CPI    1          ;TEST IF 2ND CALCULATION READ
6258 CA9662              JZ     CALCT
625B 015F68     READ1:   LXI    B,FLAG+9
625E AF                  XRA    A
625F 3C                  INR    A
6260 02                  STAX   B
6261 C39864              JMP    COUNT
6264 010070     BITLD:   LXI    B,INPUT    ;LOAD 8 CALCULATOR BITS
6267 3601                MVI    M,1
6269 AF                  XRA    A
626A 7E         BITRD:   MOV    A,M
626B 17                  RAL
626C DA7C62              JC     NXTWD
626F 0A                  LDAX   B
6270 1F                  RAR
6271 7E                  MOV    A,M
6272 17                  RAL
6273 77                  MOV    M,A
6274 3E40                MVI    A,64
6276 12                  STAX   D
6277 AF                  XRA    A
6278 12                  STAX   D
6279 C36A62              JMP    BITRD
627C AF         NXTWD:   XRA    A
627D 0A                  LDAX   B
627E 1F                  RAR
627F 7E                  MOV    A,M
6280 17                  RAL
6281 77                  MOV    M,A
6282 3E40                MVI    A,64
6284 12                  STAX   D
6285 AF                  XRA    A
6286 12                  STAX   D
6287 23                  INX    H          ;LOAD NEXT 8 BITS
6288 017D6C              LXI    B,CALCL
628B 0A                  LDAX   B
628C 3D                  DCR    A
628D C34C62              JMP    WORD
6290 21886C     READ2:   LXI    H,CALC2
6293 C34462              JMP    READC
6296 11876C     CALCT:   LXI    D,RECAL
6299 21886C              LXI    H,CALC2
629C 7E                  MOV    A,M
```

```
629D E6F0              ANI     240
629F FE00              CPI     0          ;TEST IF MSD=0
62A1 C2F862            JNZ     NOGO
62A4 3E04              MVI     A,4
62A6 BE                CMP     M          ;TEST IF MSD-1 < 4
62A7 DAF862            JC      NOGO
62AA AF                XRA     A
62AB BE                CMP     M
62AC C2B862            JNZ     DIFFT
62AF 23                INX     H
62B0 7E                MOV     A,M
62B1 E6F0              ANI     240
62B3 FE00              CPI     0          ;TEST IF DELAY <1 MS
62B5 CAF862            JZ      NOGO
62B8 217E6C   DIFFT:   LXI     H,CALC1
62BB 0E02              MVI     C,2
62BD AF                XRA     A
62BE BE       NXTDG:   CMP     M          ;TEST IF DELAY DIFFERENCE <100 US
62BF C20363            JNZ     NOGO1
62C2 23                INX     H
62C3 0D                DCR     C
62C4 B9                CMP     C          ;TEST IF 4 DIGITS COMPARED
62C5 C2BE62            JNZ     NXTDG
62C8 EB                XCHG
62C9 AF       DXFER:   XRA     A          ;TRANSFER 24 BITS TO DELAY COUNTER
62CA 77                MOV     M,A
62CB 110470            LXI     D,CALC
62CE 21886C            LXI     H,CALC2
62D1 3E80              MVI     A,128
62D3 12                STAX    D
62D4 AF                XRA     A
62D5 12                STAX    D
62D6 7D       NXT8:    MOV     A,L
62D7 FE8B              CPI     CALC2+3 AND 0FFH
62D9 CA0B63            JZ      DDATA
62DC 0608              MVI     B,8
62DE 7E                MOV     A,M
62DF 4F       NXTB:    MOV     C,A
62E0 AF                XRA     A
62E1 B8                CMP     B          ;TEST IF 8 BITS TRANSFERRED
62E2 CAF462            JZ      RNXT8
62E5 79                MOV     A,C
62E6 E680              ANI     128
62E8 12                STAX    D
62E9 F640              ORI     64
62EB 12                STAX    D
62EC AF                XRA     A
62ED 12                STAX    D
62EE 79                MOV     A,C
62EF 17                RAL
62F0 05                DCR     B
62F1 C3DF62            JMP     NXTB
62F4 23       RNXT8:   INX     H
62F5 C3D662            JMP     NXT8
62F8 EB       NOGO:    XCHG
62F9 3601     INITC:   MVI     M,1        ;INITIALIZE DELAY CALCULATION
62FB 215068            LXI     H,CNTR+4
62FE 3602              MVI     M,2
6300 C35B62            JMP     READ1
6303 EB       NOGO1:   XCHG
6304 BE                CMP     M          ;TEST FOR REPEAT CALCULATION
6305 CAF962            JZ      INITC
6308 C3C962            JMP     DXFER
630B 21886C   DDATA:   LXI     H,CALC2
630E 110A68            LXI     D,CALCD
6311 0E8B              MVI     C,CALC2+3 AND 0FFH
6313 CD2B63            CALL    AGN3       ;FORM DELAY DATA INTO 4BIT WORDS
6316 C35B62            JMP     READ1
6319 77       CALIN:   MOV     M,A        ;RESET POSITION CHANGE FLAG
631A 23                INX     H
631B 3603              MVI     M,3        ;SET CALCULATOR IN FLAG
631D 212468            LXI     H,RPOS
6320 112E68            LXI     D,RPOS1
6323 0E2C              MVI     C,RPOS+8 AND 0FFH
```

```
6325 CD2B63            CALL    AGN3
6328 C34063            JMP     INITK
632B 3EF0     AGN3:    MVI     A,240       ;ALIGN CALCULATOR DATA
632D A6                ANA     M
632E 0F                RRC
632F 0F                RRC
6330 0F                RRC
6331 0F                RRC
6332 12                STAX    D
6333 13                INX     D
6334 3E0F              MVI     A,15
6336 A6                ANA     M
6337 12                STAX    D
6338 23                INX     H
6339 13                INX     D
633A 79                MOV     A,C
633B BD                CMP     L
633C C22B63            JNZ     AGN3
633F C9                RET
6340 21D863   INITK:   LXI     H,KSEQ      ;INITIALIZE KEY SEQUENCE
6343 226868            SHLD    DATA+3
6346 215E68            LXI     H,FLAG+8
6349 3600              MVI     M,0
634B 23                INX     H
634C 3601              MVI     M,1
634E C39864            JMP     COUNT
6351 0B       KEYST:   DCX     B           ;KEY COUNT FLAG
6352 111768            LXI     D,SPOS
6355 2A6868            LHLD    DATA+3
6358 AF                XRA     A
6359 BE                CMP     M           ;TEST FOR LAST KEY
635A CA9463            JZ      LASTK
635D 7E                MOV     A,M
635E FEFF              CPI     255         ;TEST FOR KEY JUMP
6360 C27363            JNZ     KSET
6363 0A                LDAX    B
6364 FE00              CPI     0           ;TEST FOR FIRST PASS
6366 CA8663            JZ      NSET
6369 FE01              CPI     1
636B CA8C63            JZ      SET1        ;SKIP TO KEY 1
636E AF                XRA     A
636F 02                STAX    B
6370 217964            LXI     H,KSEQ+161 ;SKIP TO KEY 161
6373 7E       KSET:    MOV     A,M
6374 FE40              CPI     64
6376 D2A163            JNC     CDATA
6379 23       SETC:    INX     H           ;SET CALCULATOR KEY
637A 226868            SHLD    DATA+3
637D 210470            LXI     H,CALC
6380 E63F              ANI     63
6382 77                MOV     M,A
6383 C39864            JMP     COUNT
6386 3C       NSET:    INR     A           ;ADV AND STORE KEY JUMP COUNTER
6387 02                STAX    B
6388 23                INX     H
6389 C37363            JMP     KSET
638C 3C       SET1:    INR     A           ;ADV AND STORE KEY JUMP COUNTER
638D 02                STAX    B
638E 21D963            LXI     H,KSEQ+1 ;SET KEY SEQUENCE TO 1
6391 C37363            JMP     KSET
6394 03       LASTK:   INX     B
6395 AF                XRA     A
6396 02                STAX    B           ;RESET CALCULATOR READ FLAG
6397 015A68            LXI     B,FLAG+4
639A 0A                LDAX    B
639B 3D                DCR     A
639C 02                STAX    B
639D AF                XRA     A
639E C37963            JMP     SETC
63A1 FE80     CDATA:   CPI     128
63A3 DABB63            JC      XMTR
63A6 FEC0              CPI     192
63A8 DAAE63            JC      CONVT
63AB D2CA63            JNC     SIGN
63AE E63F     CONVT:   ANI     63
```

```
63B0 5F                MOV   E,A
63B1 1A                LDAX  D
63B2 11F066            LXI   D,NLIST
63B5 B3                ORA   E
63B6 5F                MOV   E,A
63B7 1A                LDAX  D
63B8 C37963            JMP   SETC
63BB 0A        XMTR:   LDAX  B
63BC FE00              CPI   0
63BE CAC663            JZ    INCR
63C1 7E                MOV   A,M
63C2 23                INX   H
63C3 C37963            JMP   SETC
63C6 23        INCR:   INX   H
63C7 C37363            JMP   KSET
63CA E63F      SIGN:   ANI   63
63CC 5F                MOV   E,A
63CD 1A                LDAX  D
63CE FE08              CPI   8
63D0 DA7963            JC    SETC
63D3 3E24              MVI   A,36
63D5 C37963            JMP   SETC
63D8 3A        KSEQ:   DB    58      ;F
63D9 07                DB    7       ;C
63DA 97                DB    151     ;SLGH
63DB 98                DB    152     ;SLGT
63DC 99                DB    153     ;SLGU
63DD 06                DB    6       ;DP
63DE 9A                DB    154     ;SLGTTH
63DF 9B                DB    155     ;SLGHTH
63E0 28                DB    40      ;ENTER
63E1 45                DB    69      ;0 XLGH
63E2 AE                DB    174     ;RLGH
63E3 55                DB    85      ;7 XLGT
63E4 AF                DB    175     ;RLGT
63E5 53                DB    83      ;5 XLGU
63E6 B0                DB    176     ;RLGU
63E7 06                DB    6       ;DP
63E8 52                DB    82      ;4 XLGTTH
63E9 B1                DB    177     ;RLGTTH
63EA 54                DB    84      ;6 XLGHTH
63EB B2                DB    178     ;RLGHTH
63EC 0F                DB    15      ;X NO DP
63ED F3                DB    243     ;RLGSIGN
63EE 08                DB    8       ;-
63EF 36                DB    54      ;COS
63F0 9D                DB    157     ;SLTU
63F1 06                DB    6       ;DP
63F2 9E                DB    158     ;SLTTTH
63F3 9F                DB    159     ;SLTHTH
63F4 36                DB    54      ;COS
63F5 18                DB    24      ;X
63F6 44                DB    68      ;3 XLTT
63F7 B4                DB    180     ;RLTT
63F8 55                DB    85      ;7 XLTU
63F9 B5                DB    181     ;RLTU
63FA 06                DB    6       ;DP
63FB 56                DB    86      ;8 XLTTTH
63FC B6                DB    182     ;RLTTTH
63FD 53                DB    83      ;5 XLTHTH
63FE B7                DB    183     ;RLTHTH
63FF 0F                DB    15      ;X NO DP
6400 F8                DB    248     ;RLT SIGN
6401 37                DB    55      ;TAN
6402 06                DB    6       ;DP
6403 17                DB    23      ;9
6404 17                DB    23      ;9
6405 04                DB    4       ;3
6406 03                DB    3       ;2
6407 04                DB    4       ;3
6408 02                DB    2       ;1
6409 04                DB    4       ;3
640A 12                DB    18      ;4
640B 03                DB    3       ;2
```

```
6400 22      DB    34    ;MS
640D 04      DB    4     ;3
640E 18      DB    24    ;X
640F 3A      DB    58    ;F
6410 37      DB    55    ;TAN
6411 22      DB    34    ;MS
6412 02      DB    2     ;1
6413 36      DB    54    ;COS
6414 18      DB    24    ;X
6415 9D      DB    157   ;SLTU
6416 06      DB    6     ;DP
6417 9E      DB    158   ;SLTTTH
6418 9F      DB    159   ;SLTHTH
6419 DC      DB    220   ;SLTSIGN
641A 35      DB    53    ;SIN
641B 21      DB    33    ;MR
641C 02      DB    2     ;1
641D 35      DB    53    ;SIN
641E 18      DB    24    ;X
641F 09      DB    9     ;+
6420 44      DB    68    ;3 XLTT
6421 B4      DB    180   ;RLTT
6422 55      DB    85    ;7 XLTU
6423 B5      DB    181   ;RLTU
6424 06      DB    6     ;DP
6425 56      DB    86    ;8 XLTTTH
6426 B6      DB    182   ;RLTTH
6427 53      DB    83    ;5 XLTHTH
6428 B7      DB    183   ;RLTHTH
6429 37      DB    55    ;TAN
642A 28      DB    40    ;EN
642B 18      DB    24    ;X
642C 21      DB    33    ;MR
642D 04      DB    4     ;3
642E 18      DB    24    ;X
642F 22      DB    34    ;MS
6430 02      DB    2     ;1
6431 21      DB    33    ;MR
6432 04      DB    4     ;3
6433 18      DB    24    ;X
6434 02      DB    2     ;1
6435 09      DB    9     ;+
6436 21      DB    33    ;MR
6437 02      DB    2     ;1
6438 02      DB    2     ;1
6439 09      DB    9     ;+
643A 19      DB    25    ;DIVIDE
643B 34      DB    52    ;SQUARE ROOT
643C 14      DB    20    ;6
643D 04      DB    4     ;3
643E 15      DB    21    ;7
643F 16      DB    22    ;8
6440 06      DB    6     ;DP
6441 03      DB    3     ;2
6442 05      DB    5     ;0
6443 14      DB    20    ;6
6444 12      DB    18    ;4
6445 18      DB    24    ;X
6446 22      DB    34    ;MS
6447 02      DB    2     ;1
6448 18      DB    24    ;X
6449 12      DB    18    ;4
644A 03      DB    3     ;2
644B 02      DB    2     ;1
644C 12      DB    18    ;4
644D 04      DB    4     ;3
644E 06      DB    6     ;DP
644F 12      DB    18    ;4
6450 13      DB    19    ;5
6451 03      DB    3     ;2
6452 18      DB    24    ;X
6453 03      DB    3     ;2
6454 18      DB    24    ;X
6455 24      DB    36    ;CHS
6456 21      DB    33    ;MR
```

```
6457 02               DB      2       ;1
6458 28               DB      40      ;EN
6459 18               DB      24      ;X
645A 09               DB      9       ;+
645B 02               DB      2       ;1
645C 15               DB      21      ;7
645D 15               DB      21      ;7
645E 14               DB      20      ;6
645F 05               DB      5       ;0
6460 15               DB      21      ;7
6461 05               DB      5       ;0
6462 13               DB      19      ;5
6463 03               DB      3       ;2
6464 02               DB      2       ;1
6465 09               DB      9       ;+
6466 34               DB      52      ;SQUARE ROOT
6467 06               DB      6       ;DP
6468 03               DB      3       ;2
6469 17               DB      23      ;9
646A 17               DB      23      ;9
646B 15               DB      21      ;7
646C 17               DB      23      ;9
646D 03               DB      3       ;2
646E 13               DB      19      ;5
646F 19               DB      25      ;DIVIDE
6470 A1               DB      161     ;SRADH
6471 A2               DB      162     ;SRADT
6472 A3               DB      163     ;SRADU
6473 E0               DB      224     ;SRAD SIGN
6474 09               DB      9       ;+
6475 FF               DB      255     ;KEY JUMP
6476 22               DB      34      ;MS
6477 03               DB      3       ;2
6478 FF               DB      255     ;KEY JUMP
6479 21               DB      33      ;MR
647A 03               DB      3       ;2
647B 09               DB      9       ;+
647C 03               DB      3       ;2
647D 16               DB      22      ;8
647E 05               DB      5       ;0
647F 05               DB      5       ;0
6480 05               DB      5       ;0
6481 05               DB      5       ;0
6482 08               DB      8       ;-
6483 B9               DB      185     ;CAL 10K
6484 BA               DB      186     ;CAL 1K
6485 BB               DB      187     ;CAL H
6486 BC               DB      188     ;CAL T
6487 BD               DB      189     ;CAL U
6488 08               DB      8       ;-
6489 22               DB      34      ;MS
648A 02               DB      2       ;1
648B 8A               DB      138     ;DELAY 100K
648C 8B               DB      139     ;DELAY 10K
648D 8C               DB      140     ;DELAY 1K
648E 8D               DB      141     ;DELAY H
648F 8E               DB      142     ;DELAY T
6490 8F               DB      143     ;DELAY U
6491 09               DB      9       ;+
6492 00               DB      0       ;END DIFFERENCE CALCULATION
6493 21               DB      33      ;MR
6494 02               DB      2       ;1
6496 00               DB      0       ;END DELAY READOUT
6497 00               DB      0       ;END
6498 211068   COUNT:  LXI     H,TIME
649B 01FA66           LXI     B,TLIST
649E 0A       CNTCY:  LDAX    B              ;LOAD COUNTER LIMIT-1
649F FE00             CPI     0              ;TEST FOR LAST COUNTER
64A1 CAC664           JZ      TXFER
64A4 BE               CMP     M              ;TEST FOR COUNTER LIMIT
64A5 D2BF64           JNC     CTADV
64A8 3E99             MVI     A,10011001B
64AA BE               CMP     M
64AB C2B864           JNZ     CTRES
```

```
64AE 7D                 MOV     A,L
64AF FE10               CPI     TIME AND 0FFH
64B1 C2B864             JNZ     CTRES
64B4 110770             LXI     D,ONEHZ  ;SET ONE HZ OUTPUT
64B7 12                 STAX    D        ;IF 99 PRESENT
64B8 AF         CTRES:  XRA     A        ;RESET COUNTER
64B9 77                 MOV     M,A      ;IF LIMIT REACHED
64BA 23                 INX     H
64BB 03                 INX     B
64BC C39E64             JMP     CNTCY
64BF 7E         CTADV:  MOV     A,M      ;INCREMENT COUNTER
64C0 3C                 INR     A
64C1 27                 DAA
64C2 77                 MOV     M,A
64C3 C3C664             JMP     TXFER
64C6 211068     TXFER:  LXI     H,TIME   ;TRANSFER UTC TIME TO
64C9 119268             LXI     D,LTIME  ;LOCAL TIME REGISTERS
64CC 7D         XFR:    MOV     A,L
64CD FE17               CPI     TIME+7 AND 0FFH
64CF CAD964             JZ      DST
64D2 7E                 MOV     A,M
64D3 12                 STAX    D
64D4 23                 INX     H
64D5 13                 INX     D
64D6 C3CC64             JMP     XFR
64D9 211070     DST:    LXI     H,LSW    ;TEST FOR DAYLIGHT SAVING TIME
64DC 7E                 MOV     A,M
64DD 17                 RAL
64DE D2F764             JNC     NDST
64E1 17                 RAL
64E2 7E                 MOV     A,M
64E3 D2EC64             JNC     DST1
64E6 E63F               ANI     63
64E8 3C         DST2:   INR     A
64E9 C3FA64             JMP     LOCAL
64EC E63F       DST1:   ANI     63
64EE FE00               CPI     0
64F0 CAE864             JZ      DST2
64F3 3D                 DCR     A
64F4 C3FA64             JMP     LOCAL
64F7 1F         NDST:   RAR
64F8 E63F               ANI     63
64FA 119568     LOCAL:  LXI     D,LTIME+3 ;INCREMENT OR DECREMENT
64FD 47                 MOV     B,A      ;HOUR AND DAY TIME COUNTERS
64FE 7E                 MOV     A,M      ;ACCORDING TO LOCAL TIME
64FF E6C0               ANI     192      ;SWITCH VALUE
6501 4F                 MOV     C,A
6502 78         LOCNT:  MOV     A,B
6503 FE00               CPI     0
6505 CAC265             JZ      IRIG
6508 79                 MOV     A,C
6509 17                 RAL
650A 17                 RAL
650B 1A                 LDAX    D
650C D25C65             JNC     CNTDN    ;DECREMENT HOUR AND DAY COUNTERS
650F FE23               CPI     35       ;TEST FOR HOUR LIMIT
6511 C23365             JNZ     CTUP
6514 AF                 XRA     A
6515 12                 STAX    D
6516 13                 INX     D
6517 1A                 LDAX    D
6518 FE66               CPI     102      ;TEST FOR YEAR END
651A CA3C65             JZ      CTUP3
651D FE65               CPI     101
651F CA3C65             JZ      CTUP3
6522 FE99       CTUP1:  CPI     153      ;TEST FOR U/T DAY LIMIT
6524 C24E65             JNZ     CTUP2
6527 AF                 XRA     A
6528 12                 STAX    D
6529 13                 INX     D
652A 1A                 LDAX    D
652B 3C                 INR     A
652C 12                 STAX    D
652D 1B                 DCX     D
```

```
652E 1B        CTRT:    DCX    D
652F 05        CTRT1:   DCR    B
6530 C30265             JMP    LOCNT
6533 3C        CTUP:    INR    A       ;INCREMENT HOUR COUNTER
6534 6F        CTRT2:   MOV    L,A
6535 AF                 XRA    A
6536 7D                 MOV    A,L
6537 27                 DAA
6538 12                 STAX   D
6539 C32F65             JMP    CTRT1
653C 13        CTUP3:   INX    D
653D 1A                 LDAX   D
653E E60F               ANI    15
6540 FE03               CPI    3       ;TEST FOR YEAR END
6542 C25765             JNZ    CTUP4
6545 1A                 LDAX   D
6546 E6F0               ANI    240
6548 12                 STAX   D
6549 1B                 DCX    D
654A AF                 XRA    A
654B C35365             JMP    CNTRT
654E 3C        CTUP2:   INR    A
654F 6F                 MOV    L,A
6550 AF                 XRA    A
6551 7D                 MOV    A,L
6552 27                 DAA
6553 12        CNTRT:   STAX   D
6554 C32E65             JMP    CTRT
6557 1B        CTUP4:   DCX    D
6558 1A                 LDAX   D
6559 C32265             JMP    CTUP1
655C CD8F66    CNTDN:   CALL   BCDB
655F 4F                 MOV    C,A
6560 AF        DNRT1:   XRA    A
6561 B9                 CMP    C
6562 C28065             JNZ    DOWN
6565 13                 INX    D
6566 1A                 LDAX   D
6567 FE00               CPI    0       ;TEST FOR DAY LOW LIMIT
6569 C29D65             JNZ    DOWN1
656C 13                 INX    D
656D 1A                 LDAX   D
656E E60F               ANI    15
6570 FE00               CPI    0       ;TEST FOR DAY LOW LIMIT
6572 C2B565             JNZ    DOWN2
6575 1A                 LDAX   D
6576 3C                 INR    A
6577 3C                 INR    A
6578 3C                 INR    A
6579 12                 STAX   D       ;SET DAY TO HIGH LIMIT,365
657A 1B                 DCX    D
657B 3E65               MVI    A,101
657D C3BB65             JMP    DNRT2
6580 0D        DOWN:    DCR    C       ;DECREMENT HOUR COUNTER
6581 05                 DCR    B
6582 AF                 XRA    A
6583 B8                 CMP    B
6584 C26065             JNZ    DNRT1
6587 79                 MOV    A,C
6588 CDBF66             CALL   BBCD
658B CDCB66             CALL   BBCD1
658E CDCB66             CALL   BBCD1
6591 CDCB66             CALL   BBCD1
6594 CDCB66             CALL   BBCD1
6597 79                 MOV    A,C
6598 B4                 ORA    H
6599 12                 STAX   D
659A C3C265             JMP    IRIG
659D CD8F66    DOWN1:   CALL   BCDB
65A0 3D                 DCR    A
65A1 CDBF66             CALL   BBCD
65A4 CDCB66             CALL   BBCD1
65A7 CDCB66             CALL   BBCD1
65AA CDCB66             CALL   BBCD1
```

```
65AD CDCB66            CALL    BBCD1
65B0 79                MOV     A,C
65B1 B4                ORA     H
65B2 C3BB65            JMP     DNRT2
65B5 1A       DOWN2:   LDAX    D
65B6 3D                DCR     A
65B7 12                STAX    D
65B8 1B                DCX     D
65B9 3E99              MVI     A,153
65BB 12       DNRT2:   STAX    D
65BC 1B                DCX     D
65BD 0E18              MVI     C,24      ;SET HOUR TO HIGH LIMIT
65BF C38065            JMP     DOWN
65C2 010070   IRIG:    LXI     B,INPUT
65C5 02                STAX    B         ;RESET DELAY LATCHES
65C6 219268            LXI     H,LTIME
65C9 7E                MOV     A,M
65CA E60F              ANI     15
65CC 4F                MOV     C,A
65CD 7E                MOV     A,M
65CE E6F0              ANI     240
65D0 1F                RAR
65D1 1F                RAR
65D2 1F                RAR
65D3 1F                RAR
65D4 47                MOV     B,A
65D5 11886C            LXI     D,CALC2
65D8 1A                LDAX    D
65D9 E607              ANI     7
65DB 3C                INR     A
65DC 57                MOV     D,A
65DD AF       DELAY:   XRA     A
65DE BA                CMP     D
65DF C24266            JNZ     DEC
65E2 B9                CMP     C
65E3 CA1E66            JZ      HTHCT
65E6 79                MOV     A,C
65E7 FE09              CPI     9
65E9 CAFD65            JZ      POSID
65EC AF       READI:   XRA     A
65ED 119168            LXI     D,IRIGD
65F0 1A                LDAX    D
65F1 1F                RAR
65F2 12                STAX    D
65F3 D25A66            JNC     DISPL
65F6 010270            LXI     B,INPUT+2
65F9 02                STAX    B         ;OUTPUT IRIG 1 IF DATA 1 PRESENT
65FA C35A66            JMP     DISPL
65FD 110170   POSID:   LXI     D,INPUT+1
6600 12                STAX    D         ;OUTPUT POSITION IDENTIFIER
6601 78                MOV     A,B
6602 FE00              CPI     0         ;TEST FOR MINUTE LOAD
6604 CA3466            JZ      MIN
6607 FE01              CPI     1         ;TEST FOR HOUR LOAD
6609 CA3366            JZ      HOUR
660C FE02              CPI     2         ;TEST FOR DAY LOAD
660E CA3266            JZ      DAY
6611 FE03              CPI     3         ;TEST FOR 100 DAY LOAD
6613 CA2966            JZ      DAYH
6616 AF                XRA     A
6617 119168   IDATA:   LXI     D,IRIGD
661A 12                STAX    D         ;LOAD IRIG REGISTER
661B C35A66            JMP     DISPL
661E B8       HTHCT:   CMP     B
661F C2EC65            JNZ     READI
6622 010170            LXI     B,INPUT+1
6625 02                STAX    B
6626 C33566            JMP     SEC
6629 219768   DAYH:    LXI     H,LTIME+5
662C 7E                MOV     A,M
662D E60F              ANI     15
662F C31766            JMP     IDATA
6632 23       DAY:     INX     H
6633 23       HOUR:    INX     H
```

```
6634 23        MIN:    INX     H
6635 23        SEC:    INX     H
6636 7E                MOV     A,M
6637 17                RAL
6638 E6E0              ANI     224
663A 4F                MOV     C,A
663B 7E                MOV     A,M
663C E60F              ANI     15
663E B1                ORA     C
663F C31766            JMP     IDATA
6642 B9        DEC:    CMP     C
6643 C25266            JNZ     DEC10
6646 0E09              MVI     C,9
6648 B8                CMP     B
6649 C25666            JNZ     DEC1
664C 0609              MVI     B,9
664E 15        DELY:   DCR     D
664F C3DD65            JMP     DELAY
6652 0D        DEC10:  DCR     C
6653 C34E66            JMP     DELY
6656 05        DEC1:   DCR     B
6657 C34E66            JMP     DELY
665A 015468    DISPL:  LXI     B,CNTR+8
665D 0A                LDAX    B
665E FE07              CPI     7
6660 DA6466            JC      MPCNT
6663 AF                XRA     A
6664 3C        MPCNT:  INR     A
6665 02                STAX    B
6666 4F                MOV     C,A
6667 3E91              MVI     A,LTIME-1 AND 0FFH
6669 47                MOV     B,A
666A AF                XRA     A
666B 3C        ADVCT:  INR     A
666C 04                INR     B
666D B9                CMP     C
666E C26B66            JNZ     ADVCT
6671 219268            LXI     H,LTIME
6674 68                MOV     L,B
6675 7E                MOV     A,M
6676 210570            LXI     H,DISP
6679 77                MOV     M,A
667A 115B68            LXI     D,FLAG+5
667D 1A                LDAX    D
667E FE00              CPI     0
6680 CA8566            JZ      STEST
6683 3E80              MVI     A,128
6685 B1        STEST:  ORA     C
6686 23                INX     H
6687 77                MOV     M,A
6688 F640              ORI     64
668A 77                MOV     M,A
668B E6BF              ANI     191
668D 77                MOV     M,A
668E C9        DPEND:  RET
668F E60F      BCDB:   ANI     15
6691 6F                MOV     L,A
6692 1A                LDAX    D
6693 E6F0              ANI     240
6695 17                RAL
6696 D29F66            JNC     ROT2
6699 67                MOV     H,A
669A 7D                MOV     A,L
669B C650              ADI     80
669D 6F                MOV     L,A
669E 7C                MOV     A,H
669F 17        ROT2:   RAL
66A0 D2A966            JNC     ROT3
66A3 67                MOV     H,A
66A4 7D                MOV     A,L
66A5 C628              ADI     40
66A7 6F                MOV     L,A
66A8 7C                MOV     A,H
```

```
66A9 17        ROT3:   RAL
66AA D2B366            JNC     ROT4
66AD 67                MOV     H,A
66AE 7D                MOV     A,L
66AF C614              ADI     20
66B1 6F                MOV     L,A
66B2 7C                MOV     A,H
66B3 17        ROT4:   RAL
66B4 D2BB66            JNC     BIN1
66B7 7D                MOV     A,L
66B8 C60A              ADI     10
66BA C9        BIN:    RET
66BB 7D        BIN1:   MOV     A,L
66BC C3BA66            JMP     BIN
66BF 07        BBCD:   RLC
66C0 07                RLC
66C1 07                RLC
66C2 67                MOV     H,A
66C3 E6F8              ANI     248
66C5 6F                MOV     L,A
66C6 7C                MOV     A,H
66C7 E607              ANI     7
66C9 2600              MVI     H,0
66CB FE05      BBCD1:  CPI     5
66CD DAD266            JC      SHIFT
66D0 C603              ADI     3
66D2 4F        SHIFT:  MOV     C,A
66D3 7D                MOV     A,L
66D4 17                RAL
66D5 6F                MOV     L,A
66D6 79                MOV     A,C
66D7 17                RAL
66D8 4F                MOV     C,A
66D9 7C                MOV     A,H
66DA 17                RAL
66DB B1                ORA     C
66DC E6F0              ANI     240
66DE 67                MOV     H,A
66DF 79                MOV     A,C
66E0 E60F              ANI     15
66E2 C9                RET
66E3 00                NOP
66E4 00                NOP
66E5 00                NOP
66E6 00                NOP
66E7 00                NOP
66E8 00                NOP
66E9 00                NOP
66EA 00                NOP
66EB 00                NOP
66EC 00                NOP
66ED 00                NOP
66EE 00                NOP
66EF 00                NOP
66F0 05                DB      5
66F1 02                DB      2
66F2 03                DB      3
66F3 04                DB      4
66F4 12                DB      18
66F5 13                DB      19
66F6 14                DB      20
66F7 15                DB      21
66F8 16                DB      22
66F9 17                DB      23
66FA 98        TLIST:  DB      10011000B
66FB 58                DB      01011000B
66FC 58                DB      01011000B
66FD 22                DB      00100010B
66FE 98                DB      10011000B
66FF 00                DB      0
6700 00                DB      0
0000                   END
```

| | | | | | | | |
|---|---|---|---|---|---|---|---|
| ADVCT | 666B | AGAIN | 605A | AGN3 | 632B | BBCD | 66BF |
| BBCD1 | 66CB | BCDB | 668F | BIN | 66BA | BIN1 | 66BB |
| BITL | 61F5 | BITLD | 6264 | BITRD | 626A | CALC | 7004 |
| CALC1 | 6C7E | CALC2 | 6C88 | CALCL | 6C7D | CALCD | 680A |
| CALCS | 60E7 | CALCT | 6296 | CALFL | 60EB | CALIN | 6319 |
| CDATA | 63A1 | CNTCY | 649E | CNTDN | 655C | CNTR | 684C |
| CNTRT | 6553 | CONVT | 63AE | COUNT | 6498 | CPOS | 61C1 |
| CPOS1 | 61A3 | CTADV | 64BF | CTRES | 64B8 | CTRT | 652E |
| CTRT1 | 652F | CTRT2 | 6534 | CTUP | 6533 | CTUP1 | 6522 |
| CTUP2 | 654E | CTUP3 | 653C | CTUP4 | 6557 | DATA | 6865 |
| DAY | 6632 | DAYH | 6629 | DDATA | 630B | DEC | 6642 |
| DEC1 | 6656 | DEC10 | 6652 | DELAY | 65DD | DELY | 664E |
| DIFFT | 62B8 | DISP | 7005 | DISPL | 665A | DITTO | 6015 |
| DNRT1 | 6560 | DNRT2 | 65BB | DOWN | 6580 | DOWN1 | 659D |
| DOWN2 | 65B5 | DPEND | 668E | DST | 64D9 | DST1 | 64EC |
| DST2 | 64E8 | DXFER | 62C9 | ERR | 6169 | FLAG | 6856 |
| FRAME | 6047 | FRM | 60F8 | FRMCT | 60F3 | GO | 606F |
| HILO | 610C | HOUR | 6633 | HTHCT | 661E | IDATA | 6617 |
| INC | 61BB | INCR | 63C6 | INITC | 62F9 | INITK | 6340 |
| INPUT | 7000 | IRIG | 65C2 | IRIGD | 6891 | KEYST | 6351 |
| KSEQ | 63D8 | KSET | 6373 | LASTK | 6394 | LNXT | 61E3 |
| LD | 615B | LOAD4 | 61DB | LOCAL | 64FA | LOCNT | 6502 |
| LSW | 7010 | LTIME | 6892 | MIN | 6634 | MORE | 604C |
| MPCNT | 6664 | NDST | 64F7 | NFR | 6199 | NLIST | 66F0 |
| NOGO | 62F8 | NOGO1 | 6303 | NSET | 6386 | NXT8 | 62D6 |
| NXTB | 62DF | NXTDG | 62BE | NXTWD | 627C | ONEHZ | 7007 |
| POSCT | 61C9 | POSID | 65FD | READ | 6176 | READ1 | 625B |
| READ2 | 6290 | READC | 6244 | READI | 65EC | RECAL | 6C87 |
| RNXT8 | 62F4 | ROT2 | 669F | ROT3 | 66A9 | ROT4 | 66B3 |
| RPOS | 6824 | RPOS1 | 682E | RPT | 609D | RPT1 | 6151 |
| SAT | 60C1 | SATWR | 61B2 | SEC | 6635 | SET1 | 638C |
| SETC | 6379 | SHIFT | 66D2 | SIGN | 63CA | SPOS | 6817 |
| START | 6000 | STEST | 6685 | SW | 7008 | SWCH | 61B6 |
| SWT | 60D0 | SYNC | 605D | TEST | 6126 | TIME | 6810 |
| TLIST | 66FA | TDY | 608F | TXFER | 64C6 | WAIT | 6205 |
| WORD | 624C | WRITE | 6140 | XFR | 64CC | XMTR | 63BB |
| ZEROT | 60D8 | | | | | | |

What is claimed is:

1. A receiver from satellite transmitted radio frequency carrier modulated signals in the form of pulse coded information of time values and satellite position having a known pulse rate, comprising:

a variable frequency radio frequency stage;

means for scanning said radio frequency stage over a range including the frequency of said radio frequency carrier;

means for detecting said radio frequency carrier;

means responsive to the detection of said radio frequency carrier to terminate frequency scanning and for tracking said carrier thereafter;

a clock having a nominal frequency related to the pulse rate of said time value signals from said satellite;

means responsive to the termination of scanning of said radio frequency stage for synchronizing said clock with the pulse rate of said time value signals from said satellite;

a delay path calculator;

means responsive to a detection of synchronization of said clock with the pulses of said time signals for enabling said delay path calculator for calculating the transmission path delay time to said satellite;

said delay path calculator including;

means for introducing actual receiver location information into said delay path calculator, means for calculating the path delay from satellite position received from said satellite and receiver position data;

means responsive to the delay path calculation for shifting said clock time value corrected by said delay path calculation; and means for displaying path delay corrected decoded local time code signals.

2. The combination in accordance with claim 1 including means responsive to the initiation of or said tuning means for displaying elapsed time on said time display means.

3. The combination in accordance with claim 1 including display means for indicating when said receiver is in a tuning mode as represented by operation of said tuning means.

4. The combination in accordance with claim 1 including display means for indicating when said receiver is in a synchronization mode as represented by operation of said synchronizing means.

5. The combination in accordance with claim 1 including display means for indicating when said receiver is in a calculating mode as represented by operation of said calculating means.

6. The combination in accordance with claim 1 including means responsive to loss of synchronization with said satellite for driving said time display by said clock whereby said display is operative in the absence of time code signals after a decoded time code signal has once been detected and decoded.

7. The combination in accordance with claim 1 including means responsive to the loss of said radio frequency carrier trasmitted signal for re-enabling said scanning means.

8. The combination in accordance with claim 7 including switch means for selectively establishing different frequency bands associated with different time signal source and means responsive to said switch means for automatically scanning the selected band.

9. The combination in accordance with claim 1 for use when said radio frequency carrier modulated signals originate at a ground base and are relayed by a relatively geostationary satellite to the receiver;

wherein said delay time calculator computes and totals the time of travel of time code signals from said ground base to said satellite and from said satellite to the location of said receiver and uses said total time as the path for which correction is made.

10. The combination in accordance with claim 9 wherein the ground based originated signals include satellite position information wherein said delay time calculator continuously compares the satellite position information responsive to at least two sequential satellite position signals different from the satellite position, recomputes the time delay correction and introduces that correction in the time display calculation.

11. The combination in accordance with claim 1 including means for receiving pulse train from a local source having a rate substantially equal to the data pulse rate of the remotely transmitted time signals and means for detecting deviation between said local pulse source and said data pulse rate, and means for displaying any deviation detected.

12. A receiver in accordance with claim 8 wherein said frequency scanning means includes a phase lock loop circuit employing a voltage controlled oscillator for tuning said receiver and means connecting said voltage controlled oscillator for control by said band select switch and said synchronizing means in addition to said phase locked loop whereby the operating frequency of said receiver automatically tuned and synchronized with the remote signal source.

13. The combination in accordance with claim 12 including means for detecting phase deviation of said local clock and means for slewing said local clock into synchronization with said incoming time pulses.

14. A satellite controlled clock operative to receive time code a standard pulse rate and satellite position modulated radio frequency carrier waves from either of two geostationary satellites operating at predetermined different carrier wave frequencies comprising:

a variable radio frequency receiving stage including means for detecting radio frequency carrier waves;

switch means for allowing the selection of the nominal carrier frequency of the selected one of the two satellites;

frequency scanning means for incrementally sweeping said radio frequency receiving stage through a frequency band including the selected satellite carrier frequency responsive to the application of power to the receiver and selection of satellite by said switch means;

phase lock loop means for tracking said selected satellite carrier wave responsive to the detection thereof;

means responsive to the detection of satellite carrier by said detecting means of said variable radio frequency receiving stage and tracking of said selected satellite carrier by said phase lock loop means for disabling said frequency scanning means;

a local clock operating at a nominal frequency related to the pulse rate of transmissions from said satellite;

means responsive to disablement of said frequency, scanning means for synchronizing said local clock with pulses received from said satellite;

means for decoding the time code transmitted by said satellite;

coding switch means for introducing the receiver's position into said receiver in coded form;

calculator means for calculating the path time delay of signals from said satellite from the known satellite position information and the receiver's position as introduced by said coding switch means;

means for combining the decoded time signals from said satellie and the path time delay calculator means; and means for correcting the decoded time signals from said satellite by the correction factor calculated by said path time delay calculator means for displaying the corrected local time.

15. The combination in accordance with claim 14 including first visual indicator means responsive to the initiation of frequency scanning for providing a visual indication thereof.

16. The combination in accordance with claim 14 including means responsive to the synchronizing of said local clock with satellite signals for disabling said first visual indicator means.

17. The combination in accordance with claim 14 including a second visual indicator means and means responsive to synchronization of said local clock with satellite signals for enabling said second visual indicator means.

18. The combination in accordance with claim 14 including third visual indicator means and means responsive to the operation of said calculator means for enabling said third visual indicator means.

19. The combination in accordance with claim 14 including means for enabling said calculator means, only after said local clock is synchronized with pulses received from said satellite.

20. The combination in accordance with claim 14 including means responsive to the loss of synchronism of said clock with said satellite signals for re-enabling said frequency scanning means.

21. The combination in accordance with claim 14 wherein said display means is driven by said local clock whereby the display means is incremented responsive to said clock after the loss of satellite signals.

22. The combination in accordance with claim 14 including time zone selector switch and means responsive to the position of said time zone selector switch for incrementing or decrementing the hour indication of said display means.

23. The combination in accordance with claim 14 including daylight saving time switch means and means responsive to the position of said last switch for incrementing or decrementing the hour indication of said display means by one hour.

24. The combination in accordance with claim 14 including means for receiving a local standard pulse rate nominally equal to the standard pulse rate transmitted by said satellite, means for detecting the standard pulse from said satellite, means for comparing the local and satellite standard pulse rates; and means for displaying the deviation if any from said satellite standard pulse rate.

* * * * *